(12) United States Patent
Obama et al.

(10) Patent No.: US 9,983,391 B2
(45) Date of Patent: May 29, 2018

(54) VARIABLE POWER OPTICAL ASSEMBLY, OPTICAL DEVICE, AND VARIABLE POWER OPTICAL ASSEMBLY FABRICATION METHOD

(71) Applicant: Nikon Corporation, Tokyo (JP)

(72) Inventors: Akihiko Obama, Tokyo (JP); Tomoyuki Sashima, Tokyo (JP)

(73) Assignee: Nikon Corporation, Tokyo (JP)

( * ) Notice: Subject to any disclaimer, the term of this patent is extended or adjusted under 35 U.S.C. 154(b) by 57 days.

(21) Appl. No.: 14/700,631

(22) Filed: Apr. 30, 2015

(65) Prior Publication Data

US 2015/0234162 A1     Aug. 20, 2015

Related U.S. Application Data

(63) Continuation of application No. PCT/JP2013/079241, filed on Oct. 29, 2013.

(30) Foreign Application Priority Data

Nov. 14, 2012  (JP) .................................. 2012-250252
Nov. 14, 2012  (JP) .................................. 2012-250253

(51) Int. Cl.
     *G02B 15/14*     (2006.01)
(52) U.S. Cl.
     CPC ............ *G02B 15/14* (2013.01); *Y10T 29/4984* (2015.01)
(58) Field of Classification Search
     CPC ...... G02B 15/14; G02B 13/0045; G02B 9/62; G02B 9/64
     See application file for complete search history.

(56) References Cited

U.S. PATENT DOCUMENTS 7,286,304 B1   10/2007  Ohtake
7,545,579 B2    6/2009  Sueyoshi et al.
(Continued)

FOREIGN PATENT DOCUMENTS

JP     10-268194 A     10/1998
JP     H10-268194   * 10/1998  ............. G02B 15/20
(Continued)

OTHER PUBLICATIONS

International Search Report from International Patent Application No. PCT/JP2013/079241, Jan. 21, 2014.
(Continued)

*Primary Examiner* — Joseph P Martinez
(74) *Attorney, Agent, or Firm* — Shapiro, Gabor and Rosenberger, PLLC

(57) ABSTRACT

Comprising, in order from an object side: a first lens group G1 having positive refractive power; a second lens group G2 having negative refractive power; a third lens group G3 having positive refractive power; a fourth lens group G4; a fifth lens group G5; and a sixth lens group G6; upon zooming from a wide-angle end state to a telephoto end state, a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and the distance between the fifth lens group G5 and a sixth lens group G6 being varied; and a predetermined conditional expression being satisfied, thereby providing a variable magnification optical system which has a high variable magnification ratio, is compact in size and has high optical performance, an optical apparatus, and a method for manufacturing the variable magnification optical system.

21 Claims, 12 Drawing Sheets

(56) References Cited

U.S. PATENT DOCUMENTS

| | | |
|---|---|---|
| 2006/0268428 A1 | 11/2006 | Kuroda et al. |
| 2007/0263299 A1 | 11/2007 | Ohtake |
| 2008/0143867 A1 | 6/2008 | Shirota |
| 2008/0309798 A1 | 12/2008 | Sueyoshi et al. |
| 2010/0033836 A1 | 2/2010 | Ohtake |
| 2010/0128361 A1 | 5/2010 | Shirota |

FOREIGN PATENT DOCUMENTS

| | | |
|---|---|---|
| JP | 2003-287680 A | 10/2003 |
| JP | 2005-195757 A | 7/2005 |
| JP | 2006-251468 A | 9/2006 |
| JP | 2006-301474 A | 11/2006 |
| JP | 2007-292994 A | 11/2007 |
| JP | 2008-129238 A | 6/2008 |
| JP | 2009-217167 A | 9/2009 |
| JP | 2010-039271 A | 2/2010 |
| JP | 2010-128032 A | 6/2010 |
| JP | 2011-095505 A | 5/2011 |
| WO | WO 2012/081602 A1 | 6/2012 |

OTHER PUBLICATIONS

English Translation of International Preliminary Report on Patentability from International Patent Application No. PCT/JP2013/079241, dated May 28, 2015.

Examination Report issued Mar. 28, 2018, in Indian Patent Application No. 3663/DELNP/2015.

\* cited by examiner (1)

VARIABLE POWER OPTICAL ASSEMBLY, OPTICAL DEVICE, AND VARIABLE POWER OPTICAL ASSEMBLY FABRICATION METHOD

TECHNICAL FIELD

The present invention relates to a variable magnification optical system, an optical device, and a method for producing the variable magnification optical system.

BACKGROUND ART

There have been proposed many variable magnification optical systems whose most object side lens group has positive refractive power and which are suitable for an interchangeable lens for a photographing camera, an electronic still camera, a video camera or the like, for example, in Japanese Patent application Laid-Open No. 2007-292994.

PRIOR ART DOCUMENT

Patent Document

Patent Document 1: Japanese Patent application Laid-Open Gazette No. 2007-292994

SUMMARY OF THE INVENTION

Problem to be Solved by the Invention

However, in the conventional variable magnification optical systems as described above, there was a problem that, even if it was intended to downsize an apparatus while maintaining high variable magnification ratio, sufficiently high optical performance could not have been realized.

The present invention is made in view of the above-described problem, and has an object to provide a variable magnification optical system that has a high variable magnification ratio, is compact in size and exhibits high optical performance, an optical apparatus, and a method for manufacturing the variable magnification optical system.

Means for Solving the Problem

In order to solve the above-mentioned object, according to a first aspect of the present invention, there is provided a variable magnification optical system comprising, in order from an object side: a first lens group having positive refractive power; a second lens group having negative refractive power; a third lens group having positive refractive power; a fourth lens group; a fifth lens group; and a sixth lens group;

upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group being varied; and the following conditional expressions being satisfied:

$$5.500 < f1/fw < 10.200$$

$$0.057 < (-f2)/ft < 0.200$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

Further, according to a second aspect of the present invention, there is provided an optical apparatus equipped with the variable magnification optical system according to the first aspect of the present invention.

Further, according to a third aspect of the present invention, there is provided a variable magnification optical system comprising, in order from an object side: a first lens group having positive refractive power; a second lens group having negative refractive power; a third lens group having positive refractive power; a fourth lens group; a fifth lens group; and a sixth lens group;

upon zooming from a wide-angle end state to a telephoto end state, a distance between the first lens group and the second lens group, a distance between the second lens group and the third lens group, a distance between the third lens group and the fourth lens group, a distance between fourth lens group and the fifth lens group, and a distance between the fifth lens group and the sixth lens group being varied; and a distance between the third lens group and the fifth lens group being constant.

Further, according to a fourth aspect of the present invention, there is provided an optical apparatus equipped with the variable magnification optical system according to the third aspect of the present invention.

Further, according to a fifth aspect of the present invention, there is provided a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group;

the method comprising the steps of:

constructing the first lens group and the second lens group to satisfy the following conditional expressions:

$$5.500 < f1/fw < 10.200$$

$$0.057 < (-f2)/ft < 0.200$$

where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied.

Further, according to a sixth aspect of the present invention, there is provided a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group;

the method comprising the step of:

constructing such that, upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied; and a distance between the third lens group and the fifth lens group is constant.

Effect of the Invention

According to the present invention, there are provided a variable magnification optical system which has a high variable magnification ratio, is compact in size and has excellent optical performance, an optical apparatus, and a method for manufacturing the variable magnification optical system.

EMBODIMENTS FOR CARRYING OUT THE INVENTION

Figure 1A:
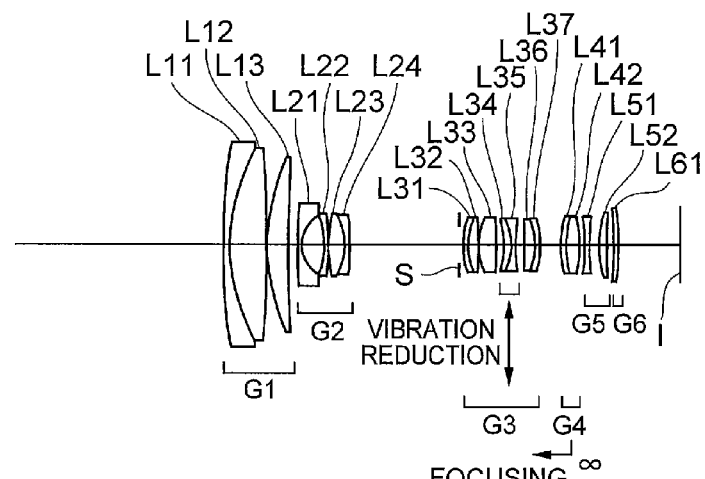
FIGS. 1A, 1B, 1C, 1D and 1E are sectional views showing a variable magnification optical system according to a First Example that is common to a first and a second embodiments of the present application, in a wide-angle end state, in a first intermediate focal length state, in a second intermediate focal length state, in a third intermediate focal length state, and in a telephoto end state, respectively.
Figure 1B:
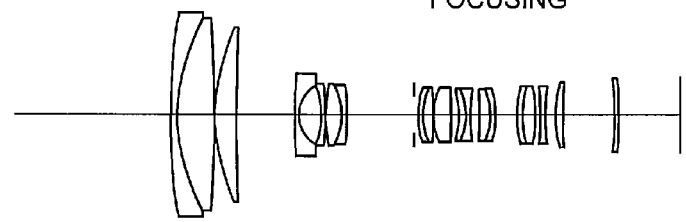
Figure 1C:
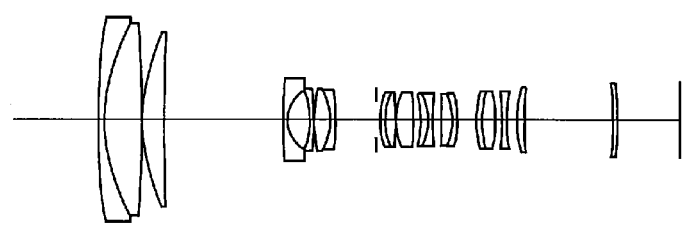
Figure 1D:
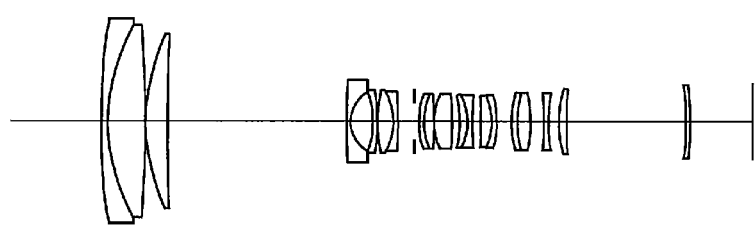
Figure 1E:
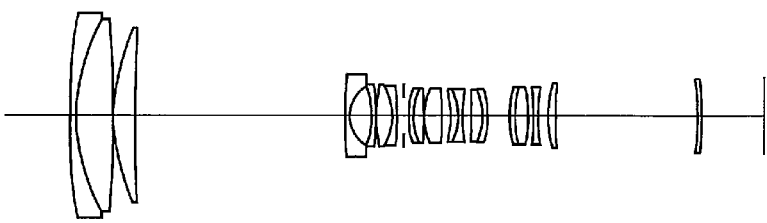

A variable magnification optical system according to a first embodiment of the present application, an optical apparatus and a method for manufacturing the variable magnification optical system are explained below.

The variable magnification optical system according to the first embodiment of the present application is characterized in that the optical system comprises, in order from an object side: a first lens group having positive refractive power; a second lens group having negative refractive power; a third lens group having positive refractive power; a fourth lens group; a fifth lens group; and a sixth lens group; and upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied. With such configuration, the variable magnification optical system according to the first embodiment of the present application can realize the zooming from the wide-angle end state to the telephoto end state and can suppress variation in each of the distortion, astigmatism and spherical aberration in connection with the zooming.

The variable magnification optical system according to the first embodiment of the present application is also characterized in that the following conditional expressions (1) and (2) are satisfied:

$$5.500 < f1/fw < 10.200 \quad (1)$$

$$0.057 < (-f2)/ft < 0.200 \quad (2)$$

where fw denotes a focal length of the variable magnification optical system in the wide angle end state, ft denotes a focal length of the variable magnification optical system in the telephoto end state, f1 denotes a focal length of the first lens group, and f2 denotes a focal length of the second lens group.

The conditional expression (1) defines a proper range of the focal length of the first lens group. The variable magnification optical system according to the first embodiment of the present application can suppress the variation in the spherical aberration and the variation in the astigmatism upon zooming, by satisfying the conditional expression (1).

When the value of f1/fw of the conditional expression (1) of the variable magnification optical system according to the first embodiment of the present application is equal to or falls below the lower limit, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (1) to 5.650.

On the other hand, when the value of f1/fw of the conditional expression (1) of the variable magnification optical system according to the first embodiment of the present application is equal to or exceeds the upper limit, in order to obtain a predetermined variable magnification ratio, it is necessary to make larger an amount of variation in the distance between the first lens group and the second lens group upon zooming. Owing to this, downsizing of the variable magnification optical system becomes difficult, and additionally, the ratio of the diameter of an on-axis light flux incident on the first lens group to the diameter of an on-axis light flux incident on the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (1) to 8.800.

The conditional expression (2) defines a proper range of the focal length of the second lens group. The variable magnification optical system according to the first embodiment of the present application can suppress the variation in the spherical aberration and the variation in the astigmatism upon zooming, by satisfying the conditional expression (2).

When the value of (−f2)/ft of the conditional expression (2) of the variable magnification optical system according to the first embodiment of the present application is equal to or falls below the lower limit, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (2) to 0.062.

On the other hand, when the value of (−f2)/ft of the conditional expression (2) of the variable magnification optical system according to the first embodiment of the present application is equal to or exceeds the upper limit, in order to obtain a predetermined variable magnification ratio, it is necessary to make larger an amount of variation in the distance between the first lens group and the second lens group upon zooming. Owing to this, downsizing of the variable magnification optical system becomes difficult, and additionally, the height of an off-axis light flux made incident from the first lens group to the second lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (2) to 0.134. Moreover, in order to attain the advantageous effect of the present application even more surely, it is even more preferable to set the upper limit value of the conditional expression (2) to 0.090.

With the above described construction, it is possible to realize a variable magnification optical system that has a high variable magnification ratio, is compact in size and has high optical performance.

In the variable magnification optical system according to the first embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the first embodiment of the present application, it is desirable that the third lens group is moved toward the object side upon zooming from the wide-angle end state to the telephoto end state. With such configuration, it is possible to make smaller the refractive power of the fourth lens group and the fifth lens group compared with a case wherein the third lens group is not moved to the object side. Consequently, it is possible to suppress the variation in the astigmatism occurring in the fourth lens group and fifth lens group upon zooming.

In the variable magnification optical system according to the first embodiment of the present application, it is desirable that the following conditional expression (3) is satisfied:

$$0.420 < f3/f4 < 2.300 \qquad (3)$$

where f3 denotes a focal length of the third lens group, and f4 denotes a focal length of the fourth lens group.

The conditional expression (3) defines a proper range of the ratio of focal length between the third lens group and the fourth lens group. By satisfying the conditional expression (3), the variable magnification optical system according to the first embodiment of the present application can suppress the variation in each of the spherical aberration, the coma aberration and the astigmatism upon zooming.

When the value of f3/f4 of the conditional expression (3) of the variable magnification optical system according to the first embodiment of the present application is equal to or falls below the lower limit, the variation in the spherical aberration occurring in the third lens group upon zooming becomes excessively large, with the result that high optical performance cannot be realized. Meanwhile, in order to attain the advantageous effect of the present application more surely, it is more preferable to set the lower limit value of the conditional expression (3) to 0.710.

On the other hand, when the value of f3/f4 of the conditional expression (3) of the variable magnification optical system according to the first embodiment of the present application is equal to or exceeds the upper limit, it becomes difficult to suppress the variation in the coma aberration and variation in the astigmatism occurring in the fourth lens group upon zooming, with the result that high optical performance cannot be realized. Meanwhile, in order to attain the advantageous effect of the present application more surely, it is more preferable to set the upper limit value of the conditional expression (3) to 1.150. Moreover, in order to attain the advantageous effect of the present application even more surely, it is even more preferable to set the upper limit value of the conditional expression (3) to 0.985.

In the variable magnification optical system according to the first embodiment of the present application, it is desirable that the following conditional expression (4) is satisfied:

$$3.600 < f1/(-f2) < 7.510 \tag{4}$$

where f1 denotes a focal length of the first lens group, and f2 denotes a focal length of the second lens group.

The conditional expression (4) defines a proper range of the ratio of focal length between the first lens group and the second lens group. By satisfying the conditional expression (4), the variable magnification optical system according to the first embodiment of the present application can suppress variation in the spherical aberration and variation in the astigmatism upon zooming.

When the value of f1/(−f2) of the conditional expression (4) of the variable magnification optical system according to the first embodiment of the present application is equal to or falls below the lower limit, negative spherical aberration occurring in the first lens group in the telephoto end state becomes excessively large. Consequently, the variation in the spherical aberration becomes excessively large upon zooming, so that the realization of high optical performance is impossible. Meanwhile, in order to attain the advantageous effect of the present application more surely, it is more preferable to set the lower limit value of the conditional expression (4) to 5.000.

On the other hand, when the value of f1/(−f2) of the conditional expression (4) of the variable magnification optical system according to the first embodiment of the present application is equal to or exceeds the upper limit, it becomes difficult to suppress the variation in the spherical aberration and variation in the astigmatism occurring in the second lens group upon zooming, with the result that high optical performance cannot be realized.

In the variable magnification optical system according to the first embodiment of the present application, it is desirable that the sixth lens group is fixed for its position upon zooming from the wide-angle end state to the telephoto end state. With such configuration, it is possible to vary the height of marginal light rays made incident from the fifth lens group onto the sixth lens group from the optical axis upon zooming. Owing to this, the variation in the astigmatism can be suppressed more successfully upon zooming.

In the variable magnification optical system according to the first embodiment of the present application, it is desirable that the sixth lens group has positive refractive power. With such construction, the usable magnification of the sixth lens group becomes smaller than the life-size magnification, and as a result, the composite focal length from the first lens group to the fifth lens group can be made relatively larger. Owing to this, influence, such as eccentric coma caused by eccentricity among the lenses occurring in the first lens group to the fifth lens group during manufacturing, can be reduced to be relatively smaller. Consequently, high optical performance can be realized.

In the variable magnification optical system according to the first embodiment of the present application, it is desirable that the fifth lens group has negative refractive power. With such construction, it is possible to increase the magnification of the fifth lens group upon zooming from the wide-angle end state to the telephoto end state. It is also possible to realize high variable magnification ratio efficiently and at the same time to suppress the variation in the coma aberration and variation in the astigmatism upon zooming.

In the variable magnification optical system according to the first embodiment of the present application, it is desirable that the fourth lens group has positive refractive power. With such construction, it is possible to suppress the variation in the spherical aberration and variation in the astigmatism upon zooming.

In the variable magnification optical system according to the first embodiment of the present application, it is desirable that the distance between the third lens group and the fifth lens group is constant upon zooming from the wide-angle end state to the telephoto end state. With such construction, it is possible to suppress the variation in each of the spherical aberration, astigmatism and distortion, occurring in the third lens group and the fifth lens group upon zooming.

In the variable magnification optical system according to the first embodiment of the present application, it is desirable that the distance between the first lens group and the second lens group is increased upon zooming from the wide-angle end state to the telephoto end state. With such construction, it is possible to increase the magnification of the second lens group. It is also possible to realize high variable magnification ratio efficiently and at the same time to suppress the variation in the spherical aberration and variation in the astigmatism upon zooming.

In the variable magnification optical system according to the first embodiment of the present application, it is desirable that the distance between the second lens group and the third lens group is decreased upon zooming from the wide-angle end state to the telephoto end state. With such construction, it is possible to increase the composite magnification of from the third lens group to the fifth lens group. It is also possible to realize high variable magnification ratio efficiently and at the same time to suppress the variation in the spherical aberration and variation in the astigmatism upon zooming.

In the variable magnification optical system according to the first embodiment of the present application, it is desirable that at least a portion of the third lens group is moved to have a component in a direction perpendicular to the optical axis. With such construction, it is possible to make a correction of image blurring caused by camera shake or the like, in other words, to conduct vibration reduction. It is also possible to reduce the variation in the coma aberration upon conducting the vibration reduction, so that it is preferable.

In the variable magnification optical system according to the first embodiment of the present application, it is desirable that at least a portion of the fourth lens group is moved in the direction of optical axis upon varying focusing from an infinitely distant object to a close distant object. With such construction, it is possible to reduce the variation in the spherical aberration upon focusing, so that it is preferable.

An optical apparatus of the present application is characterized in that it is equipped with the variable magnification optical system according to the first embodiment of the present application, having the above described configuration. Consequently, it is possible to realize an optical apparatus that has a high variable magnification ratio, is compact in size, and exhibits high optical performance.

A method for manufacturing the variable magnification optical system according to the first embodiment of the present application is characterized by a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group; the method comprising the steps of: constructing the first lens group and the second lens group to satisfy the following conditional expressions (1) and (2):

$$5.500 < f1/fw < 10.200 \qquad (1)$$

$$0.057 < (-f2)/ft < 0.200 \qquad (2)$$

where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied. With this configuration, it is possible to manufacture a variable magnification optical system that has a high variable magnification ratio, is compact in size, and exhibits high optical performance.

A variable magnification optical system according to the second embodiment of the present application, an optical apparatus and a method for manufacturing the variable magnification optical system are explained below.

The variable magnification optical system according to the second embodiment of the present application is characterized in that the optical system comprises, in order from an object side: a first lens group having positive refractive power; a second lens group having negative refractive power; a third lens group having positive refractive power; and a fourth lens group; a fifth lens group; and a sixth lens group; and upon zooming from a wide-angle end state to a telephoto end state, a distance between the first lens group and the second lens group, a distance between the second lens group and the third lens group, and a distance between the third lens group and the fourth lens group, a distance between fourth lens group and the fifth lens group, and a distance between the fifth lens group and the sixth lens group are varied. With such configuration, the variable magnification optical system according to the second embodiment of the present application can realize the zooming from the wide-angle end state to the telephoto end state and can suppress variation in each of the distortion, astigmatism and spherical aberration in connection with the zooming.

The variable magnification optical system according to the second embodiment of the present application is also characterized in that a distance between the third lens group and the fifth lens group is constant. With this construction, it is possible to suppress the variation in each of the spherical aberration, astigmatism and distortion occurring in the third lens group and the fifth lens group upon zooming.

With the above described construction, it is possible to realize a variable magnification optical system that has a high variable magnification ratio, is compact in size and has high optical performance.

In the variable magnification optical system according to the second embodiment of the present application, it is desirable that the following conditional expression (5) is satisfied:

$$0.350 < f3/(-f5) < 2.000 \qquad (5)$$

where f3 denotes a focal length of the third lens group, and f5 denotes a focal length of the fifth lens group.

The conditional expression (5) defines a proper range of the ratio of focal length between the third lens group and the fifth lens group. By satisfying the conditional expression (5), the variable magnification optical system according to the second embodiment of the present application can suppress the variation in each of the spherical aberration, the coma aberration and the astigmatism upon zooming.

When the value of f3/(−f5) of the conditional expression (5) of the variable magnification optical system according to the second embodiment of the present application is equal to or falls below the lower limit, the variation in the spherical aberration occurring in the third lens group upon zooming becomes excessively large, with the result that high optical performance cannot be realized. Meanwhile, in order to attain the advantageous effect of the present application more surely, it is more preferable to set the lower limit value of the conditional expression (5) to 0.550.

On the other hand, when the value of f3/(−f5) of the conditional expression (5) of the variable magnification optical system according to the second embodiment of the present application is equal to or exceeds the upper limit, it becomes difficult to suppress the variation in the coma aberration and variation in the astigmatism occurring in the fourth lens group upon zooming, with the result that high optical performance cannot be realized. Meanwhile, in order to attain the advantageous effect of the present application more surely, it is more preferable to set the upper limit value of the conditional expression (5) to 1.450.

In the variable magnification optical system according to the second embodiment of the present application, it is desirable that the following conditional expression (3) is satisfied:

$$0.420 < f3/f4 < 2.300 \qquad (3)$$

where f3 denotes a focal length of the third lens group, and f4 denotes a focal length of the fourth lens group.

The conditional expression (3) defines a proper range of the ratio of focal length between the third lens group and the fourth lens group. By satisfying the conditional expression (3), the variable magnification optical system according to the second embodiment of the present application can suppress the variation in each of the spherical aberration, the coma aberration and the astigmatism upon zooming.

When the value of f3/f4 of the conditional expression (3) of the variable magnification optical system according to the second embodiment of the present application is equal to or falls below the lower limit, the variation in the spherical aberration occurring in the third lens group upon zooming becomes excessively large, with the result that high optical performance cannot be realized. Meanwhile, in order to attain the advantageous effect of the present application more surely, it is more preferable to set the lower limit value of the conditional expression (3) to 0.710.

On the other hand, when the value of f3/f4 of the conditional expression (3) of the variable magnification optical system according to the second embodiment of the present application is equal to or exceeds the upper limit, it becomes difficult to suppress the variation in the coma aberration and variation in the astigmatism occurring in the fourth lens group upon zooming, with the result that high optical performance cannot be realized. Meanwhile, in order to attain the advantageous effect of the present application more surely, it is more preferable to set the upper limit value of the conditional expression (3) to 1.150. Moreover, in order to attain the advantageous effect of the present application even more surely, it is even more preferable to set the upper limit value of the conditional expression (3) to 0.985.

In the variable magnification optical system according to the second embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the second embodiment of the present application, it is desirable that the third lens group is moved toward the object side upon zooming from the wide-angle end state to the telephoto end state. With such configuration, it is possible to make smaller the refractive power of the fourth lens group and the fifth lens group compared with a case wherein the third lens group is not moved to the object side. Consequently, it is possible to suppress the variation in the astigmatism occurring in the fourth lens group and fifth lens group upon zooming.

In the variable magnification optical system according to the second embodiment of the present application, it is desirable that the sixth lens group is fixed for its position upon zooming from the wide-angle end state to the telephoto end state. With such configuration, it is possible to vary the height of marginal light rays made incident from the fifth lens group to the sixth lens group from the optical axis upon zooming. Owing to this, the variation in the astigmatism can be suppressed more successfully upon zooming.

In the variable magnification optical system according to the second embodiment of the present application, it is desirable that the sixth lens group has positive refractive power. With such construction, the usable magnification of the sixth lens group becomes smaller than the life-size magnification, and as a result, the composite focal length from the first lens group to the fifth lens group can be made relatively larger. Owing to this, influence, such as eccentric coma caused by eccentricity among the lenses occurring in the first lens group to the fifth lens group during manufacturing, can be reduced to be relatively smaller. Consequently, high optical performance can be realized.

In the variable magnification optical system according to the second embodiment of the present application, it is desirable that the fifth lens group has negative refractive power. With such construction, it is possible to increase the magnification of the fifth lens group upon zooming from the wide-angle end state to the telephoto end state. It is also possible to realize high variable magnification ratio efficiently and at the same time to suppress the variation in the coma aberration and variation in the astigmatism upon zooming.

In the variable magnification optical system according to the second embodiment of the present application, it is desirable that the fourth lens group has positive refractive power. With such construction, it is possible to suppress the variation in the spherical aberration and variation in the astigmatism upon zooming.

In the variable magnification optical system according to the second embodiment of the present application, it is desirable that the distance between the first lens group and the second lens group is increased upon zooming from the wide-angle end state to the telephoto end state. With such construction, it is possible to increase the magnification of the second lens group. It is also possible to realize high variable magnification ratio efficiently and at the same time to suppress the variation in the spherical aberration and variation in the astigmatism upon zooming.

In the variable magnification optical system according to the second embodiment of the present application, it is desirable that the distance between the second lens group and the third lens group is decreased upon zooming from the wide-angle end state to the telephoto end state. With such construction, it is possible to increase the composite magnification of from the third lens group to the fifth lens group. It is also possible to realize high variable magnification ratio efficiently and at the same time to suppress the variation in the spherical aberration and variation in the astigmatism upon zooming.

In the variable magnification optical system according to the second embodiment of the present application, it is desirable that at least a portion of the third lens group is moved to have a component in a direction perpendicular to the optical axis. With such construction, it is possible to make a correction of image blurring caused by camera shake or the like, in other words, to conduct vibration reduction. It is also possible to reduce the variation in the coma aberration upon conducting the vibration reduction, so that it is preferable.

In the variable magnification optical system according to the second embodiment of the present application, it is desirable that at least a portion of the fourth lens group is moved in the direction of the optical axis upon varying focusing from an infinitely distant object to a close distant object. With such construction, it is possible to reduce the variation in the spherical aberration upon focusing, so that it is preferable.

An optical apparatus of the present application is characterized in that it is equipped with the variable magnification optical system according to the second embodiment of the present application, having the above described configuration. Consequently, it is possible to realize an optical apparatus that has a high variable magnification ratio, is compact in size, and exhibits high optical performance.

A method for manufacturing the variable magnification optical system according to the second embodiment of the present application is characterized by a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group; the method comprising the step of: constructing such that, upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied; and a distance between the third lens group and the fifth lens group is constant. Owing to this, it is possible to manufacture a variable magnification optical system that has a high variable magnification ratio, is compact in size, and exhibits high optical performance.

Hereinafter, variable magnification optical systems relating to numerical examples according to the first and the second embodiments of the present application will be explained with reference to the accompanying drawings. Meanwhile, the first to the third examples are common to all of the first and the second embodiments.

First Example

FIGS. 1A, 1B, 1C, 1D and 1E are sectional views showing a variable magnification optical system according to a first Example that is common to the first and the second embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; a fifth lens group G5 having negative refractive power; and a sixth lens group G6 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a negative meniscus lens L22 having a concave surface facing the object side, and a cemented lens constructed by a double convex positive lens L23 cemented with a negative meniscus lens L24 having a concave surface facing the object side. Note that the negative meniscus lens L21 is a glass mold type aspherical lens having an object side lens surface formed into an aspherical shape. Also, the negative meniscus lens L24 is a glass mold type aspherical lens having an image side lens surface formed into an aspherical shape.

The third lens group G3 consists of, in order from the object side, a cemented lens constructed by a negative meniscus lens L31 having a convex surface facing the object side cemented with a double convex positive lens L32, a double convex positive lens L33, a cemented lens constructed by a positive meniscus lens L34 having a concave surface facing the object side cemented with a double concave negative lens L35, and a cemented lens constructed by a double convex positive lens L36 cemented with a negative meniscus lens L37 having a concave surface facing the object side. Note that an aperture stop S is provided on the object side of the third lens group G3.

The fourth lens group G4 consists of a cemented lens constructed, in order from the object side, by a negative meniscus lens L41 having a convex surface facing the object side cemented with a double convex positive lens L42. Note that the negative meniscus lens L41 is a glass mold type aspherical lens having an object side lens surface formed into an aspherical shape.

The fifth lens group G5 consists of, in order from the object side, a double concave negative lens L51 and a positive meniscus lens L52 having a convex surface facing the object side.

The sixth lens group G6 consists of a positive meniscus lens L61 having a concave surface facing the object side. Note that the positive meniscus lens L61 is a glass mold type aspherical lens having an image side lens surface formed into an aspherical shape.

In the variable magnification optical system according to the present Example, having the above described construction, upon zooming from the wide angle end state to the telephoto end state, the first to the fifth lens groups G1 to G5 and the aperture stop S are moved toward the object side, and the sixth lens group G6 is fixed in its position in the direction of optical axis. At that time, the third lens group G3, the fifth lens group G5 and the aperture stop S are integrally moved.

Thus, upon zooming, an air distance between the first lens group G1 and the second lens group G2 is increased, while an air distance between the second lens group G2 and the third lens group G3 is decreased. Also upon zooming, an air distance between the third lens group G3 and the fourth lens group G4 is decreased in a state from the wide angle end to the third intermediate focal length state and is increased in a state from the third intermediate focal length state to the telephoto end state. Also upon zooming, an air distance between the fourth lens group G4 and the fifth lens group G5 is increased in a state from the wide angle end to the third intermediate focal length state and is decreased in a state from the third intermediate focal length state to the telephoto end state. Also upon zooming, an air distance between the fifth lens group G5 and the sixth lens group G6 is increased.

Further, in the variable magnification optical system according to the present Example, when camera shake or the like occurs, the cemented lens constructed by the positive meniscus lens L34 and the negative lens L35 in the third lens group G3 can be configured to shift in a direction including a component perpendicular to the optical axis as a vibration reduction lens group to conduct the vibration reduction. Furthermore, in the variable magnification optical system according to the present Example, which is not limited to the above configuration, the cemented lens constructed by the positive meniscus lens L34 and the negative lens L35, and the cemented lens constructed by the positive lens L36 and the negative meniscus lens L37 may be used as the vibration reduction lens group.

In the variable magnification optical system according to the present Example, the cemented lens constructed by the negative meniscus lens L41 and the positive lens L42 in the fourth lens group G4 is moved along the optical axis toward the object side to thereby conduct focusing from an infinitely distant object to a close distant object.

Table 1 below shows various values of the variable magnification optical system according to the present Example.

In Table 1, f denotes a focal length, and BF denotes a back focal length, in other words, a distance on the optical axis between the most image side lens surface and an image plane I.

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and vd denotes an Abbe number for d-line (wavelength λ=587.6 nm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature r, a paraxial radius of curvature is shown. A refractive index of air nd=1.000000 is omitted.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8+A10h^{10}+A12h^{12}$$

where h denotes a vertical height from the optical axis, x denotes a sag amount which is a distance along the optical axis from the tangent surface at the vertex of the aspherical surface to the aspherical surface at the vertical height h, K denotes a conical coefficient, A4, A6, A8, A10 and A12 denote respective aspherical coefficients, and r denotes a paraxial radius of curvature that is a radius of curvature of a reference sphere. "E-n", where n is an integer, denotes "×10$^{-n}$", for example, "1.234E-05" denotes "1.234×10$^{-5}$". The 2nd order aspherical surface coefficient A2 is 0, and omitted in the description.

In [Various Data], FNO denotes an F-number, ω denotes a half angle of view (unit "°"), Y denotes an image height, TL denotes a total length of the variable magnification optical system, that is, a distance along the optical axis from the first surface to the image plane I upon focusing on an infinite distant object, do denotes a variable interval between an n-th surface and an (n+1)-th surface, and φ is an aperture diameter of an aperture stop S. Meanwhile, W denotes a wide-angle end state, M1 denotes a first intermediate focal length state, M2 denotes a second intermediate focal length state, M3 denotes a third intermediate focal length state, and T denotes a telephoto end state.

In [Lens Group Data], there are shown a starting surface number ST and a focal length f of each lens group.

In [Values for Conditional Expressions], values corresponding to respective conditional expressions for the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced for its dimension, the unit is not necessarily to be limited to "mm".

The reference symbols in Table 1 described above are also used in Tables for the other Examples provided later in the same way.

TABLE 1

First Example

[Surface Data]

| m | r | d | nd | vd |
|---|---|---|---|---|
| OP | ∞ | | | |
| 1 | 138.7561 | 1.6350 | 1.903660 | 31.27 |
| 2 | 42.7802 | 8.2143 | 1.497820 | 82.57 |
| 3 | −302.0350 | 0.1000 | | |
| 4 | 44.5217 | 4.7770 | 1.816000 | 46.59 |
| 5 | 271.5483 | d5 | | |
| *6 | 500.0000 | 1.0000 | 1.851350 | 40.10 |
| 7 | 8.1506 | 4.9434 | | |
| 8 | −14.9679 | 1.0000 | 1.883000 | 40.66 |
| 9 | −40.3672 | 0.1000 | | |
| 10 | 51.0611 | 3.3538 | 1.808090 | 22.74 |
| 11 | −13.1253 | 1.0000 | 1.851350 | 40.10 |
| *12 | −56.0605 | d12 | | |
| 13 | ∞ | 1.0000 | Aperture Stop S | |
| 14 | 16.8549 | 1.0000 | 2.001000 | 29.13 |
| 15 | 12.8453 | 2.3167 | 1.516800 | 63.88 |
| 16 | −344.8312 | 0.2826 | | |
| 17 | 16.7180 | 3.8814 | 1.516800 | 63.88 |
| 18 | −102.0119 | 1.8000 | | |
| 19 | −31.7646 | 1.7730 | 1.950000 | 29.37 |
| 20 | −12.0000 | 1.0000 | 1.772500 | 49.62 |
| 21 | 47.5308 | 1.8000 | | |
| 22 | 56.8994 | 2.7389 | 1.516800 | 63.88 |
| 23 | −10.1297 | 1.0000 | 2.000690 | 25.46 |
| 24 | −20.0855 | d24 | | |
| *25 | 19.9643 | 1.0000 | 1.834410 | 37.28 |
| 26 | 12.9126 | 3.3590 | 1.487490 | 70.32 |
| 27 | −20.6924 | d27 | | |

TABLE 1-continued

First Example

| 28 | −36.7881 | 1.0000 | 1.883000 | 40.66 |
|---|---|---|---|---|
| 29 | 22.9040 | 2.1715 | | |
| 30 | 18.3642 | 1.8393 | 1.688930 | 31.16 |
| 31 | 74.4874 | d31 | | |
| 32 | −62.3494 | 1.0000 | 1.583130 | 59.46 |
| *33 | −39.0765 | BF | | |
| I | ∞ | | | |

[Aspherical Data]

| m | 6 |
|---|---|
| κ | −9.00000 |
| A4 | 8.23003E−05 |
| A6 | −8.48619E−07 |
| A8 | 4.81601E−09 |
| A10 | −1.21118E−11 |
| A12 | −3.71030E−14 |
| m | 12 |
| κ | 7.14630 |
| A4 | −1.75054E−07 |
| A6 | −2.79453E−07 |
| A8 | −6.78452E−10 |
| A10 | 3.65328E−12 |
| A12 | 0.00000 |
| m | 25 |
| κ | 1.00000 |
| A4 | −4.54869E−05 |
| A6 | −1.13234E−08 |
| A8 | −2.74200E−09 |
| A10 | 2.72745E−11 |
| A12 | 0.00000 |
| m | 33 |
| κ | 1.00000 |
| A4 | 3.84906E−05 |
| A6 | −1.38988E−07 |
| A8 | 5.70664E−10 |
| A10 | 0.00000 |
| A12 | 0.00000 |

[Various Data]
Variable magnification ratio 14.13

| | W | | T |
|---|---|---|---|
| f | 9.27 | ~ | 130.94 |
| FNO | 4.12 | ~ | 5.78 |
| ω | 42.64 | ~ | 3.37° |
| Y | 8.00 | | 8.00 |
| TL | 103.33 | ~ | 156.05 |

| | W | M1 | M2 | M3 | T |
|---|---|---|---|---|---|
| f | 9.26970 | 17.98478 | 35.07599 | 79.49640 | 130.94357 |
| ω | 42.64411 | 23.02223 | 12.26869 | 5.54597 | 3.36834 |
| FNO | 4.12 | 5.04 | 5.76 | 5.77 | 5.78 |
| φ | 8.54 | 8.54 | 8.56 | 9.57 | 10.14 |
| d5 | 2.10000 | 13.51510 | 27.27150 | 40.97034 | 47.34606 |
| d12 | 24.49494 | 14.93344 | 8.94342 | 3.50414 | 1.50000 |
| d24 | 4.83432 | 4.83333 | 3.99353 | 3.10000 | 4.83058 |
| d27 | 1.16379 | 1.16478 | 2.00458 | 2.89811 | 1.16753 |
| d31 | 1.60333 | 11.92048 | 20.22794 | 27.23252 | 32.06948 |
| BF | 14.04941 | 14.04940 | 14.04942 | 14.04974 | 14.05058 |

[Lens Group Data]

| | ST | f |
|---|---|---|
| G1 | 1 | 69.61022 |
| G2 | 6 | −9.31640 |
| G3 | 14 | 24.10850 |
| G4 | 25 | 26.49998 |
| G5 | 28 | −32.51973 |
| G6 | 32 | 176.73133 |

[Values for Conditional Expressions]

(1) f1/fw = 7.510
(2) (−f2)/ft = 0.072

TABLE 1-continued

First Example (3) f3/f4 = 0.910
(4) f1/(−f2) = 7.472
(5) f3/(−f5) = 0.741

Figure 2A:
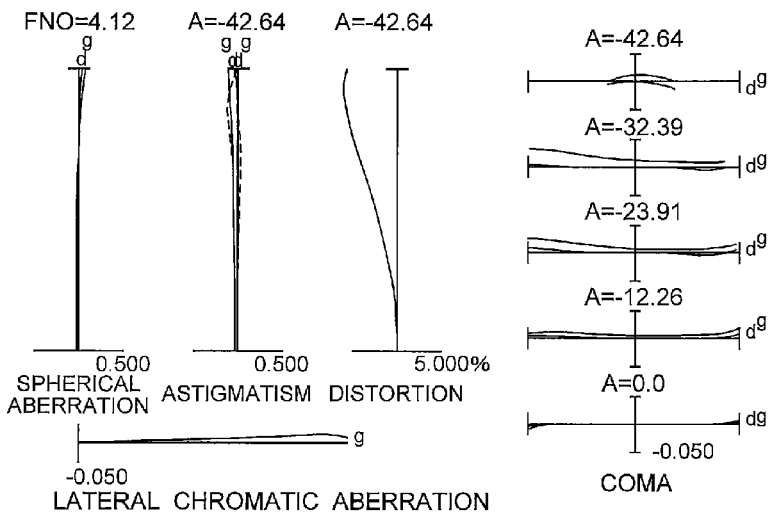
FIGS. 2A, 2B and 2C are graphs showing various aberrations of the variable magnification optical system according to the First Example of the present application upon focusing on an infinite distance object, in the wide-angle end state, in the first intermediate focal length state, and in the second intermediate focal length state, respectively.
Figure 2B:
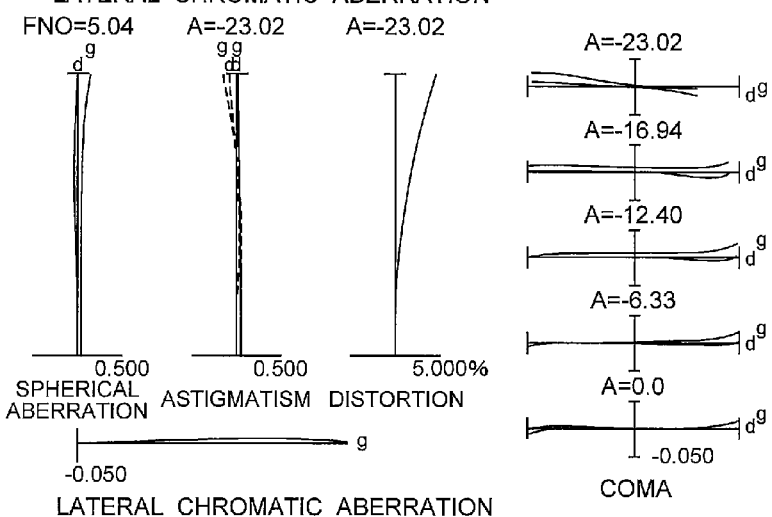
Figure 2C:
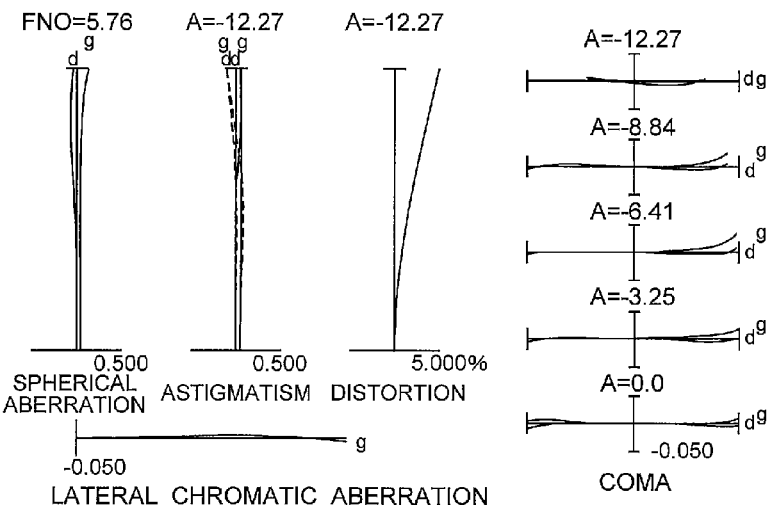

FIGS. 2A, 2B and 2C are graphs showing various aberrations of the variable magnification optical system according to the First Example of the present application upon focusing on an infinite distance object, in a wide angle end state, in a first intermediate focal length state, and in a second intermediate focal length state, respectively.

Figure 3A:
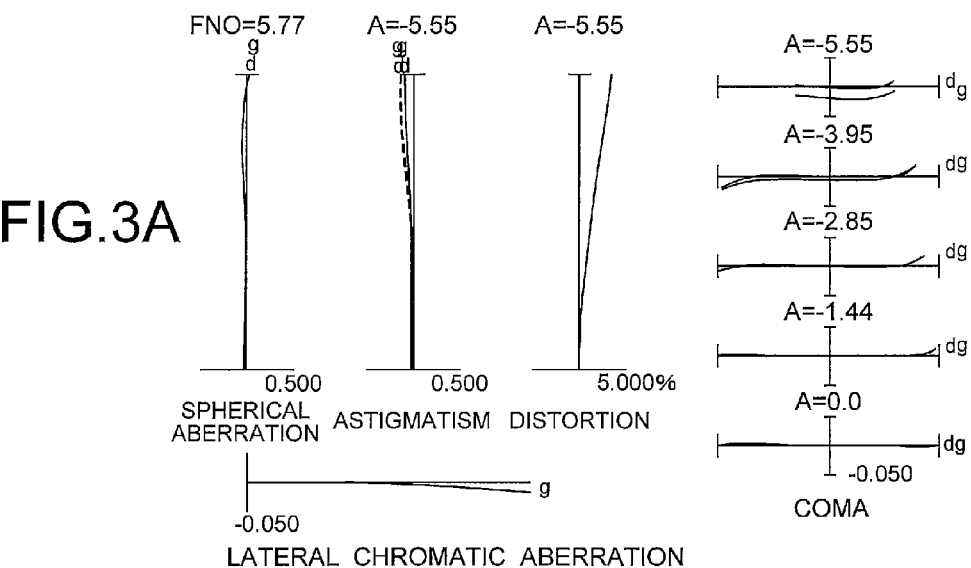
FIGS. 3A and 3B are graphs showing various aberrations of the variable magnification optical system according to the First Example of the present application upon focusing on an infinite distance object, in the third intermediate focal length state, and in the telephoto end state, respectively.
Figure 3B:
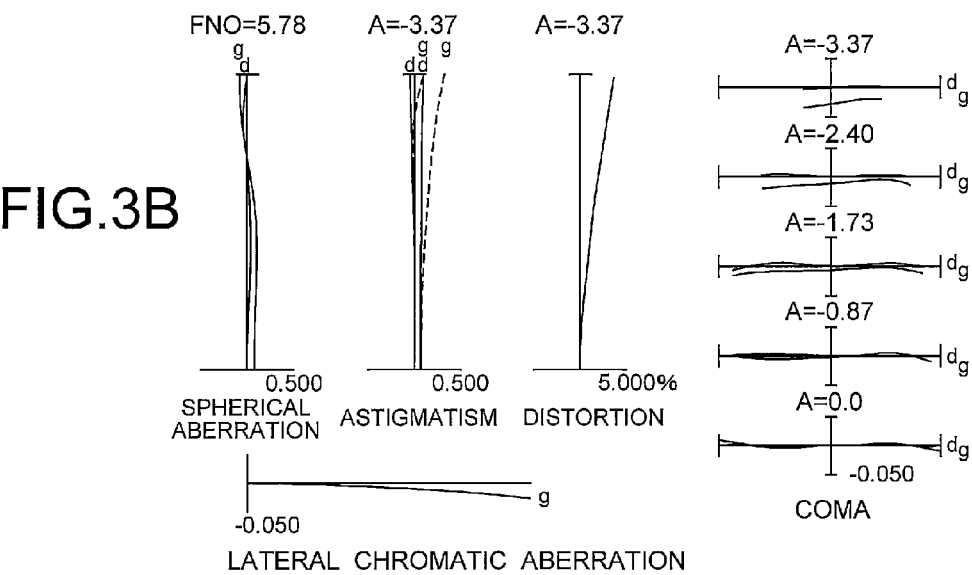
Figure 4A:
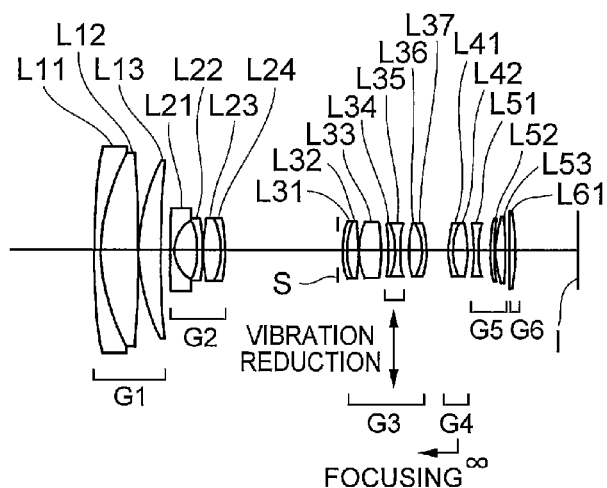
FIGS. 4A, 4B, 4C, 4D and 4E are sectional views showing a variable magnification optical system according to a Second Example that is common to the first and the second embodiments of the present application, in a wide-angle end state, in a first intermediate focal length state, in a second intermediate focal length state, in a third intermediate focal length state, and in a telephoto end state, respectively.
Figure 4B:
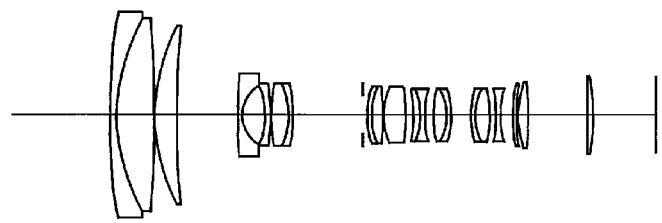
Figure 4C:
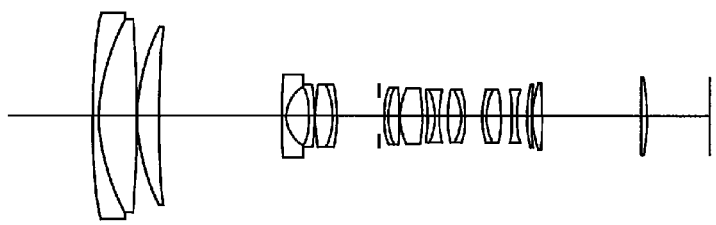
Figure 4D:
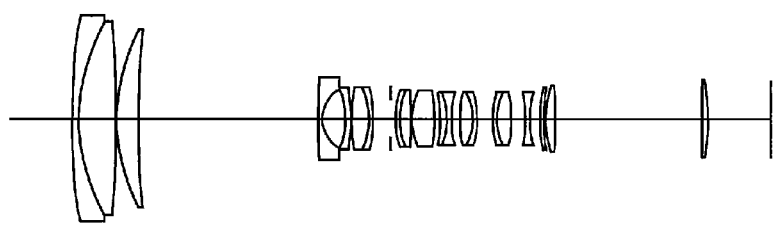
Figure 4E:
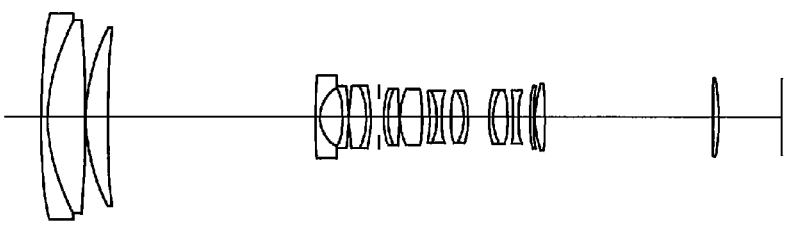

FIGS. 3A and 3B are graphs showing various aberrations of the variable magnification optical system according to the First Example of the present application upon focusing on an infinite distance object, in a third intermediate focal length state, and in a telephoto end state, respectively.

In respective aberration graphs, FNO denotes an F-number, and A denotes an incidence angle of light ray, that is, a half angle of view (unit "°"). In the graphs, d denotes an aberration curve at d-line (wavelength 587.6 nm), g denotes an aberration curve at g-line (wavelength 435.8 nm), and a curve not accompanied by d and g denotes an aberration at the d-line. In the graph showing astigmatism, a solid line indicates a sagittal image plane, and a broken line indicates a meridional image plane.

Incidentally, the same symbols as in the present Example are used also in various aberration graphs in the other Examples given later.

As is apparent from the respective aberration graphs, the variable magnification optical system according to the present Example shows superb optical performance as a result of good corrections to various aberrations in the states from the wide-angle end state to the telephoto end state.

Second Example

FIGS. 4A, 4B, 4C, 4D and 4E are sectional views showing a variable magnification optical system according to a Second Example that is common to the first and second embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; a fifth lens group G5 having negative refractive power; and a sixth lens group G6 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a negative meniscus lens L22 having a concave surface facing the object side, and a cemented lens constructed by a double convex positive lens L23 cemented with a negative meniscus lens L24 having a concave surface facing the object side. Note that the negative meniscus lens L21 is a glass mold type aspherical lens having an object side lens surface formed into an aspherical shape. Also, the negative meniscus lens L24 is a glass mold type aspherical lens having an image side lens surface formed into an aspherical shape.

The third lens group G3 consists of, in order from the object side, a cemented lens constructed by a negative meniscus lens L31 having a convex surface facing the object side cemented with a positive meniscus lens L32 having a convex surface facing the object side, a double convex positive lens L33, a cemented lens constructed by a positive meniscus lens L34 having a concave surface facing the object side cemented with a double concave negative lens L35, and a cemented lens constructed by a double convex positive lens L36 cemented with a negative meniscus lens L37 having a concave surface facing the object side. Note that an aperture stop S is provided on the object side of the third lens group G3.

The fourth lens group G4 consists of a cemented lens constructed, in order from the object side, by a negative meniscus lens L41 having a convex surface facing the object side cemented with a double convex positive lens L42. Note that the negative meniscus lens L41 is a glass mold type aspherical lens having an object side lens surface formed into an aspherical shape.

The fifth lens group G5 consists of, in order from the object side, a double concave negative lens L51, a positive meniscus lens L52 having a convex surface facing the object side and a positive meniscus lens L53 having a convex surface facing the object side.

The sixth lens group G6 consists of a double convex positive lens L61. Note that the positive lens L61 is a glass mold type aspherical lens having an image side lens surface formed into an aspherical shape.

In the variable magnification optical system according to the present Example, having the above described construction, upon zooming from the wide angle end state to the telephoto end state, the first to the fifth lens groups G1 to G5 and the aperture stop S are moved toward the object side, and the sixth lens group G6 is fixed in the position in the direction of optical axis. At that time, the third lens group G3, the fifth lens group G5 and the aperture stop S are integrally moved.

Thus, upon zooming, an air distance between the first lens group G1 and the second lens group G2 is increased, while an air distance between the second lens group G2 and the third lens group G3 is decreased. Also upon zooming, an air distance between the third lens group G3 and the fourth lens group G4 is not substantially varied in a state from the wide angle end to the first intermediate focal length state, is decreased in a state from the first intermediate focal length state to the third intermediate focal length state and is increased in a state from the third intermediate focal length state to the telephoto end state. Also upon zooming, an air distance between the fourth lens group G4 and the fifth lens group G5 is not substantially varied in a state from the wide angle end to the first intermediate focal length state, is increased in a state from the first intermediate focal length state to the third intermediate focal length state and is decreased in a state from the third intermediate focal length state to the telephoto end state. Also upon zooming, an air distance between the fifth lens group G5 and the sixth lens group G6 is increased.

Further, in the variable magnification optical system according to the present Example, when camera shake or the like occurs, the cemented lens constructed by the positive meniscus lens L34 and the negative lens L35 in the third lens group G3 can be configured to shift in a direction including a component perpendicular to the optical axis as a vibration reduction lens group to conduct the vibration reduction. Furthermore, in the variable magnification optical system according to the present Example, which is not limited to the above configuration, the cemented lens constructed by the positive meniscus lens L34 and the negative lens L35, and the cemented lens constructed by the positive lens L36 and the negative meniscus lens L37 may be used as the vibration reduction lens group.

In the variable magnification optical system according to the present Example, the cemented lens constructed by the negative meniscus lens L41 and the positive lens L42 in the fourth lens group G4 is moved along the optical axis toward the object side to thereby conduct focusing from an infinitely distant object to a close distant object.

Table 2 below shows various values of the variable magnification optical system according to the present Example.

TABLE 2

Second Example

[Surface Data]

| m | r | d | nd | νd |
|---|---|---|---|---|
| OP | ∞ | | | |
| 1 | 132.6359 | 1.6350 | 1.903660 | 31.27 |
| 2 | 42.6997 | 8.1417 | 1.497820 | 82.57 |
| 3 | −325.2613 | 0.1000 | | |
| 4 | 44.4637 | 4.7551 | 1.816000 | 46.59 |
| 5 | 265.6270 | d5 | | |
| *6 | 500.0000 | 1.0000 | 1.851348 | 40.10 |
| 7 | 8.2943 | 5.0608 | | |
| 8 | −14.5917 | 1.0000 | 1.883000 | 40.66 |
| 9 | −53.0958 | 0.4500 | | |
| 10 | 120.6169 | 3.8630 | 1.808090 | 22.74 |
| 11 | −13.4596 | 1.0000 | 1.851348 | 40.10 |
| *12 | −30.3078 | d12 | | |
| 13 | ∞ | 1.0000 | Aperture Stop S | |
| 14 | 19.4243 | 1.0000 | 2.000690 | 25.46 |
| 15 | 15.0112 | 2.4393 | 1.583130 | 59.42 |
| 16 | 2147.1305 | 0.4959 | | |
| 17 | 19.1055 | 4.6119 | 1.487490 | 70.32 |
| 18 | −104.4778 | 1.8000 | | |
| 19 | −34.2822 | 1.8490 | 1.950000 | 29.37 |
| 20 | −12.0000 | 1.0000 | 1.804000 | 46.60 |
| 21 | 50.0687 | 1.8000 | | |
| 22 | 29.0599 | 2.9395 | 1.517420 | 52.20 |
| 23 | −11.4030 | 1.0000 | 2.000690 | 25.46 |
| 24 | −23.5616 | d24 | | |
| *25 | 18.2398 | 1.0000 | 1.834410 | 37.28 |
| 26 | 10.5163 | 3.4843 | 1.487490 | 70.32 |
| 27 | −26.7878 | d27 | | |
| 28 | −35.5672 | 1.0000 | 1.883000 | 40.66 |
| 29 | 22.0346 | 2.5669 | | |
| 30 | 34.4390 | 1.0276 | 1.592700 | 35.27 |
| 31 | 57.9072 | 0.2140 | | |
| 32 | 20.8607 | 1.9156 | 1.592700 | 35.27 |
| 33 | 101.2362 | d33 | | |
| 34 | 4642.0718 | 1.2942 | 1.583130 | 59.46 |
| *35 | −45.6613 | BF | | |
| I | ∞ | | | |

[Aspherical Data]

| m | 6 |
|---|---|
| κ | 11.00000 |
| A4 | 6.84259E−05 |
| A6 | −6.52908E−07 |
| A8 | 2.89592E−09 |
| A10 | −3.59067E−12 |
| A12 | −4.70830E−14 |
| m | 12 |
| κ | 5.34460 |

TABLE 2-continued

Second Example

| A4 | 8.80293E−06 |
|---|---|
| A6 | −8.24015E−08 |
| A8 | −1.99203E−09 |
| A10 | 1.93534E−11 |
| A12 | 0.00000 |
| m | 25 |
| κ | 1.00000 |
| A4 | −2.50506E−05 |
| A6 | 4.23962E−08 |
| A8 | −1.01207E−09 |
| A10 | 1.78131E−11 |
| A12 | 0.00000 |
| m | 35 |
| κ | 1.00000 |
| A4 | 3.13362E−05 |
| A6 | −1.05523E−07 |
| A8 | 3.01765E−10 |
| A10 | 0.00000 |
| A12 | 0.00000 |

[Various Data]
Variable magnification ratio 14.13

| | W | | T |
|---|---|---|---|
| f | 9.27 | ~ | 130.95 |
| FNO | 4.11 | ~ | 5.77 |
| ω | 42.65 | ~ | 3.36° |
| Y | 8.00 | ~ | 8.00 |
| TL | 108.72 | ~ | 165.55 |

| | W | M1 | M2 | M3 | T |
|---|---|---|---|---|---|
| f | 9.26996 | 18.00205 | 35.14141 | 79.50027 | 130.95058 |
| ω | 42.64659 | 23.02117 | 12.24275 | 5.53491 | 3.36308 |
| FNO | 4.11 | 5.14 | 5.77 | 5.77 | 5.77 |
| φ | 8.78 | 8.78 | 9.00 | 10.44 | 10.99 |
| d5 | 2.10000 | 13.14641 | 27.04732 | 40.02188 | 46.57745 |
| d12 | 25.78504 | 15.86682 | 9.46650 | 3.71398 | 1.50000 |
| d24 | 4.77009 | 4.77089 | 3.65901 | 3.00000 | 4.76972 |
| d27 | 1.34602 | 1.34523 | 2.45711 | 3.11612 | 1.34640 |
| d33 | 1.22984 | 13.40455 | 22.49406 | 33.05903 | 37.86288 |
| BF | 14.04908 | 14.04867 | 14.04916 | 14.04907 | 14.04906 |

[Lens Group Data]

| | ST | f |
|---|---|---|
| G1 | 1 | 69.16097 |
| G2 | 6 | −9.84950 |
| G3 | 14 | 24.91408 |
| G4 | 25 | 32.52464 |
| G5 | 28 | −33.25545 |
| G6 | 34 | 77.54903 |

[Values for Conditional Expressions]

(1) f1/fw = 7.461
(2) (−f2)/ft = 0.075
(3) f3/f4 = 0.766
(4) f1/(−f2) = 7.022
(5) f3/(−f5) = 0.749

Figure 5A:
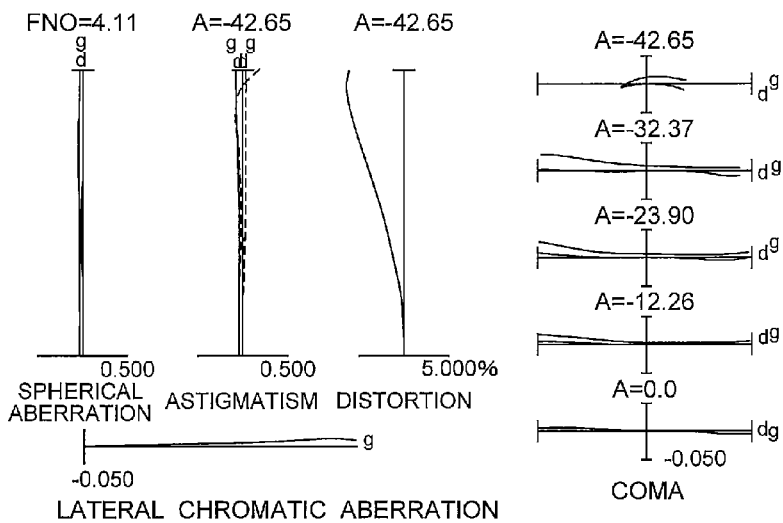
FIGS. 5A, 5B and 5C are graphs showing various aberrations of the variable magnification optical system according to the Second Example of the present application upon focusing on an infinite distance object, in the wide-angle end state, in the first intermediate focal length state, and in the second intermediate focal length state, respectively.
Figure 5B:
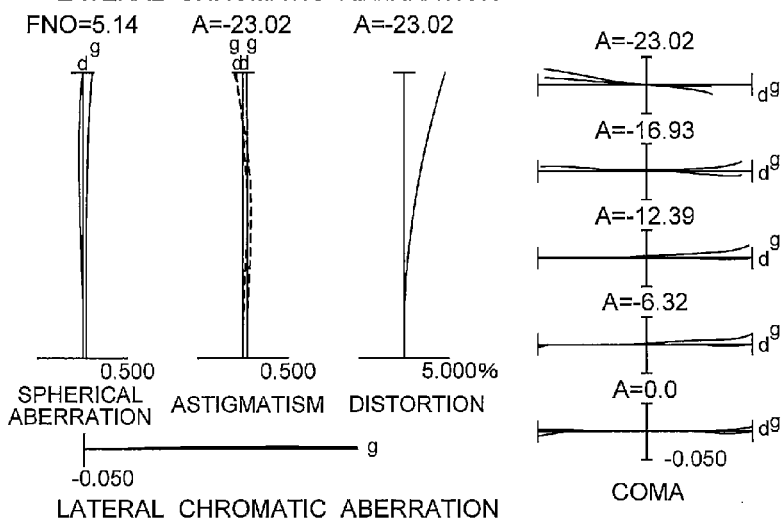
Figure 5C:
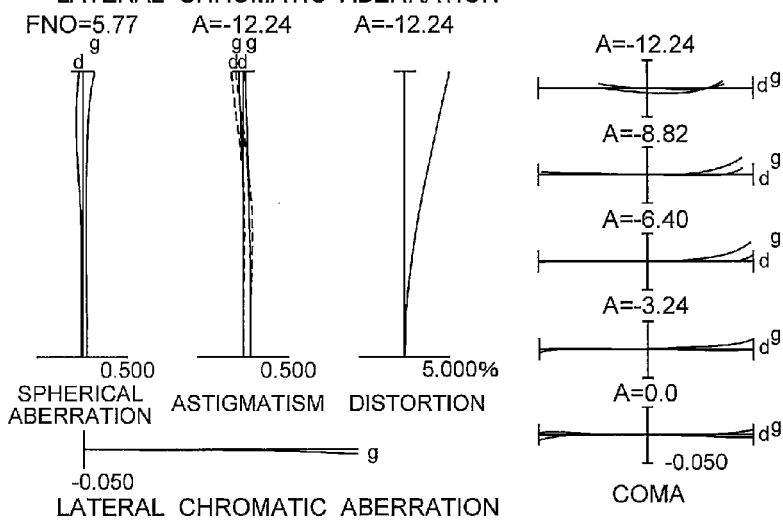

FIGS. 5A, 5B and 5C are graphs showing various aberrations of the variable magnification optical system according to the Second Example of the present application upon focusing on an infinite distance object, in a wide angle end state, in a first intermediate focal length state, and in a second intermediate focal length state, respectively.

Figure 6A:
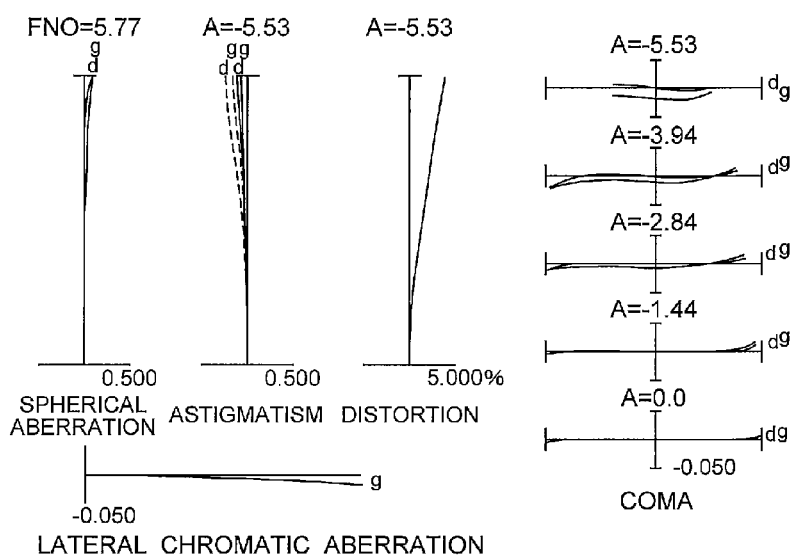
FIGS. 6A and 6B are graphs showing various aberrations of the variable magnification optical system according to the Second Example of the present application upon focusing on an infinite distance object, in the third intermediate focal length state, and in the telephoto end state, respectively.
Figure 6B:
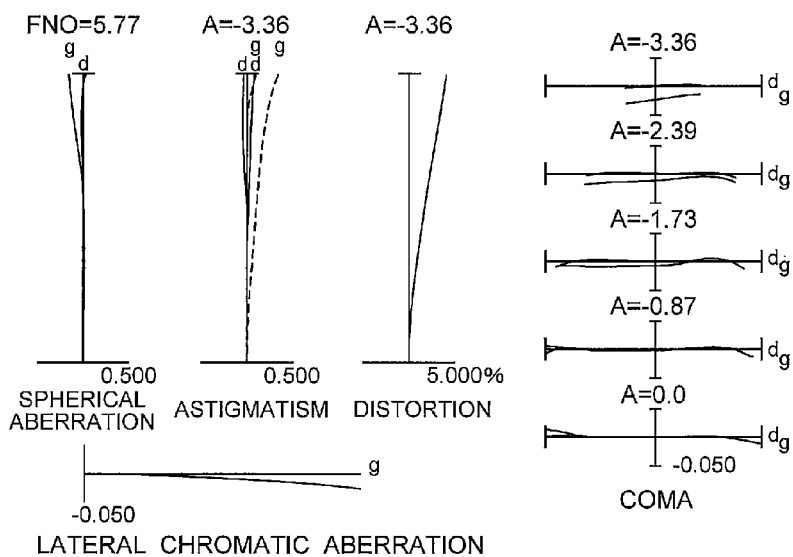
Figure 7A:
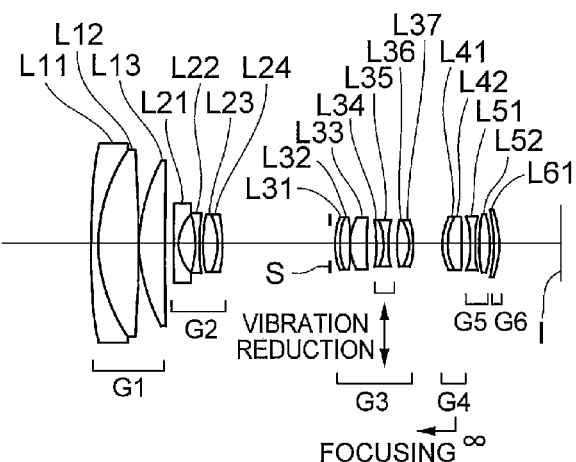
FIGS. 7A, 7B, 7C, 7D and 7E are sectional views showing a variable magnification optical system according to a Third Example that is common to the first and the second embodiments of the present application, in a wide-angle end state, in a first intermediate focal length state, in a second intermediate focal length state, in a third intermediate focal length state, and in a telephoto end state, respectively.
Figure 7B:
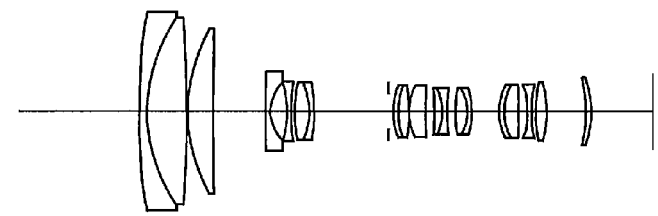
Figure 7C:
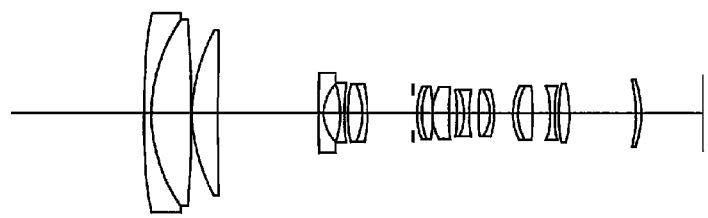
Figure 7D:
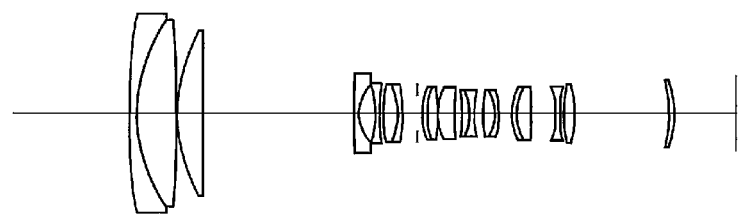
Figure 7E:
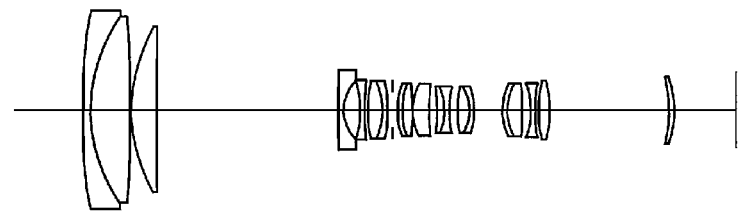

FIGS. 6A and 6B are graphs showing various aberrations of the variable magnification optical system according to the Second Example of the present application upon focusing on an infinite distance object, in a third intermediate focal length state, and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

Third Example

FIGS. 7A, 7B, 7C, 7D and 7E are sectional views showing a variable magnification optical system according to a Third Example that is common to the first and second embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; a fifth lens group G5 having negative refractive power; and a sixth lens group G6 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Note that the negative meniscus lens L21 is a glass mold type aspherical lens having an object side lens surface formed into an aspherical shape.

The third lens group G3 consists of, in order from the object side, a cemented lens constructed by a negative meniscus lens L31 having a convex surface facing the object side cemented with a double convex positive lens L32, a positive meniscus lens L33 having a convex surface facing the object side, a cemented lens constructed by a positive meniscus lens L34 having a concave surface facing the object side cemented with a double concave negative lens L35, and a cemented lens constructed by a double convex positive lens L36 cemented with a negative meniscus lens L37 having a concave surface facing the object side. Note that an aperture stop S is provided on the object side of the third lens group G3.

The fourth lens group G4 consists of a cemented lens constructed, in order from the object side, by a negative meniscus lens L41 having a convex surface facing the object side cemented with a double convex positive lens L42. Note that the negative meniscus lens L41 is a glass mold type aspherical lens having an object side lens surface formed into an aspherical shape.

The fifth lens group G5 consists of, in order from the object side, a double concave negative lens L51, and a double convex positive lens L52. Note that the negative lens L51 is a glass mold type aspherical lens having an object side lens surface formed into an aspherical shape.

The sixth lens group G6 consists of a positive meniscus lens L61 having a concave surface facing the object side. Note that the positive meniscus lens L61 is a glass mold type aspherical lens having an image side lens surface formed into an aspherical shape.

In the variable magnification optical system according to the present Example, having the above described construction, upon zooming from the wide angle end state to the telephoto end state, the first lens group G1, the third to the fifth lens groups G3 to G5 and the aperture stop S are moved toward the object side. At that time, the third lens group G3, the fifth lens group G5 and the aperture stop S are integrally moved. Also upon zooming, the second lens group G2 is moved to the object side in a state from the wide angle end to the first intermediate focal length state, is moved to the image side in a state from the first intermediate focal length state to the third intermediate focal length state, and is moved to the object side in a state from the third intermediate focal length state to the telephoto end state. Also upon zooming, the sixth lens group G6 is fixed for the position in the direction of optical axis.

Thus, upon zooming, an air distance between the first lens group G1 and the second lens group G2 is increased, while an air distance between the second lens group G2 and the third lens group G3 is decreased. Also upon zooming, an air distance between the third lens group G3 and the fourth lens group G4 is decreased in a state from the wide angle end to the third intermediate focal length state and is increased in a state from the third intermediate focal length state to the telephoto end state. Also upon zooming, an air distance between the fourth lens group G4 and the fifth lens group G5 is increased in a state from the wide angle end to the third intermediate focal length state and is decreased in a state from the third intermediate focal length state to the telephoto end state. Also upon zooming, an air distance between the fifth lens group G5 and the sixth lens group G6 is increased.

Further, in the variable magnification optical system according to the present Example, when camera shake or the like occurs, the cemented lens constructed by the positive meniscus lens L34 and the negative lens L35 in the third lens group G3 can be configured to shift in a direction including a component perpendicular to the optical axis as a vibration reduction lens group to conduct the vibration reduction. Furthermore, in the variable magnification optical system according to the present Example, which is not limited to the above configuration, the cemented lens constructed by the positive meniscus lens L34 and the negative lens L35, and the cemented lens constructed by the positive lens L36 and the negative meniscus lens L37 may be used as the vibration reduction lens group.

In the variable magnification optical system according to the present Example, the cemented lens constructed by the negative meniscus lens L41 and the positive lens L42 in the fourth lens group G4 is moved along the optical axis toward the object side to thereby conduct focusing from an infinitely distant object to a close distant object.

Table 3 below shows various values of the variable magnification optical system according to the present Example.

TABLE 3

Third Example

[Surface Data]

| m | r | d | nd | vd |
|---|---|---|---|---|
| OP | ∞ | | | |
| 1 | 147.9013 | 1.6350 | 1.902650 | 35.72 |
| 2 | 35.6621 | 9.2469 | 1.497820 | 82.57 |
| 3 | −200.0000 | 0.1000 | | |
| 4 | 39.1600 | 5.4354 | 1.755000 | 52.33 |

TABLE 3-continued

Third Example

| | | | | |
|---|---|---|---|---|
| 5 | 1276.0689 | d5 | | |
| *6 | 500.0000 | 1.0000 | 1.851350 | 40.10 |
| 7 | 9.9096 | 4.0795 | | |
| 8 | −21.5362 | 1.0000 | 1.883000 | 40.66 |
| 9 | 61.9357 | 0.5771 | | |
| 10 | 28.1760 | 3.3431 | 1.808090 | 22.74 |
| 11 | −16.0125 | 1.0000 | 1.883000 | 40.66 |
| 12 | −68.1696 | d12 | | |
| 13 | ∞ | 1.0000 | Aperture Stop S | |
| 14 | 19.4128 | 1.0000 | 2.001000 | 29.13 |
| 15 | 13.4853 | 2.3758 | 1.518230 | 58.82 |
| 16 | −100.7156 | 0.1463 | | |
| 17 | 15.0209 | 4.0207 | 1.518230 | 58.82 |
| 18 | 204.4633 | 1.8000 | | |
| 19 | −28.3320 | 1.8512 | 1.950000 | 29.37 |
| 20 | −12.0000 | 1.0000 | 1.719990 | 50.27 |
| 21 | 39.0032 | 1.9232 | | |
| 22 | 61.4199 | 2.6210 | 1.593190 | 67.90 |
| 23 | −10.6309 | 1.0000 | 2.000690 | 25.46 |
| 24 | −19.4068 | d24 | | |
| *25 | 16.3114 | 1.0000 | 1.834410 | 37.28 |
| 26 | 11.0229 | 3.3231 | 1.487490 | 70.32 |
| 27 | −43.6056 | d27 | | |
| *28 | −14.4352 | 1.0000 | 1.820800 | 42.71 |
| 29 | 40.8079 | 0.8343 | | |
| 30 | 49.8401 | 2.1154 | 1.672700 | 32.18 |
| 31 | −34.3561 | d31 | | |
| 32 | −30.0441 | 1.0940 | 1.583130 | 59.46 |
| *33 | −18.4435 | BF | | |
| I | ∞ | | | |

[Aspherical Data]

| | |
|---|---|
| m | 6 |
| κ | 11.00000 |
| A4 | 1.46758E−05 |
| A6 | −1.20928E−07 |
| A8 | 3.63942E−10 |
| A10 | 2.23207E−12 |
| A12 | −4.38330E−14 |
| m | 25 |
| κ | 1.00000 |
| A4 | −2.68760E−05 |
| A6 | 3.45468E−09 |
| A8 | −1.34363E−09 |
| A10 | 2.46674E−11 |
| A12 | 0.00000 |
| m | 28 |
| κ | 1.00000 |
| A4 | 6.88321E−05 |
| A6 | −1.36380E−07 |
| A8 | 1.91010E−09 |
| A10 | −1.82027E−10 |
| A12 | 0.00000 |
| m | 33 |
| κ | 1.00000 |
| A4 | 6.40427E−05 |
| A6 | −1.29760E−07 |
| A8 | −9.25012E−10 |
| A10 | 0.00000 |
| A12 | 0.00000 |

[Various Data]
Variable magnification ratio 14.12

| | W | | T |
|---|---|---|---|
| f | 10.30 | ~ | 145.42 |
| FNO | 4.12 | ~ | 5.78 |
| ω | 39.66 | ~ | 3.00° |
| Y | 8.00 | | 8.00 |
| TL | 106.91 | ~ | 147.55 |

| | W | M1 | M2 | M3 | T |
|---|---|---|---|---|---|
| f | 10.29728 | 17.98475 | 34.94711 | 79.45072 | 145.41967 |
| ω | 39.65984 | 23.06221 | 12.28283 | 5.50036 | 2.99741 |
| FNO | 4.12 | 4.88 | 5.49 | 5.77 | 5.78 |

TABLE 3-continued

Third Example

| | | | | | |
|---|---|---|---|---|---|
| φ | 8.78 | 8.78 | 8.78 | 9.32 | 10.10 |
| d5 | 2.10000 | 11.36023 | 22.73111 | 34.07789 | 40.86134 |
| d12 | 25.44232 | 18.07043 | 10.58381 | 3.75584 | 1.50000 |
| d24 | 6.54666 | 6.31441 | 4.45845 | 3.00000 | 6.63250 |
| d27 | 2.13021 | 2.36246 | 4.21842 | 5.67687 | 2.04437 |
| d31 | 1.11813 | 8.99915 | 15.47141 | 21.61332 | 26.93973 |
| BF | 14.05093 | 14.05140 | 14.05141 | 14.03447 | 14.05263 |

[Lens Group Data]

| | ST | f |
|---|---|---|
| G1 | 1 | 60.27060 |
| G2 | 6 | −9.90188 |
| G3 | 14 | 23.84501 |
| G4 | 25 | 32.34765 |
| G5 | 28 | −25.12840 |
| G6 | 32 | 79.16334 |

[Values for Conditional Expressions]

(1) f1/fw = 5.853
(2) (−f2)/ft = 0.068
(3) f3/f4 = 0.737
(4) f1/(−f2) = 6.087
(5) f3/(−f5) = 0.949

Figure 8A:
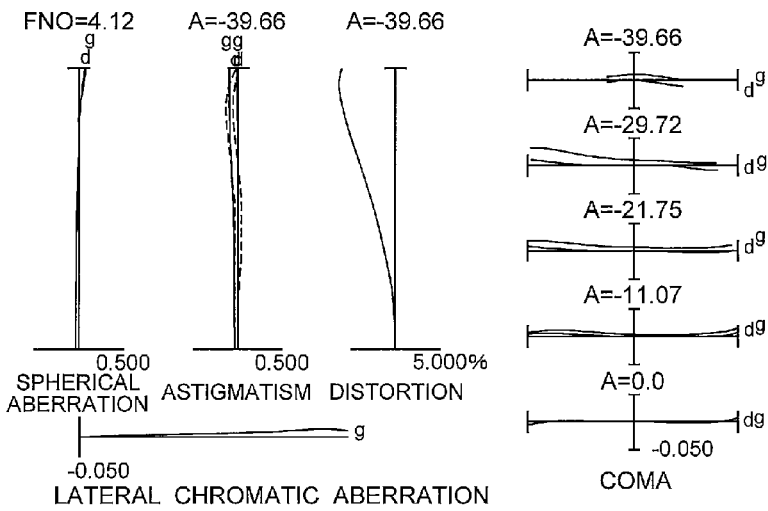
FIGS. 8A, 8B and 8C are graphs showing various aberrations of the variable magnification optical system according to the Third Example of the present application upon focusing on an infinite distance object, in the wide-angle end state, in the first intermediate focal length state, and in the second intermediate focal length state, respectively.
Figure 8B:
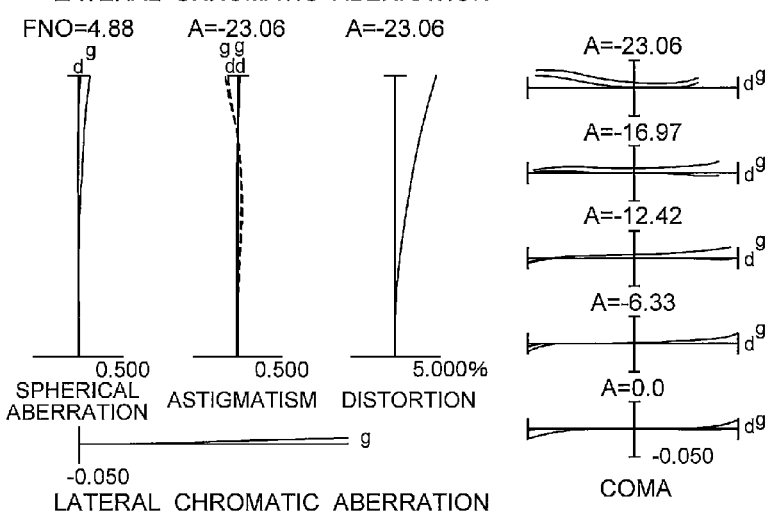
Figure 8C:
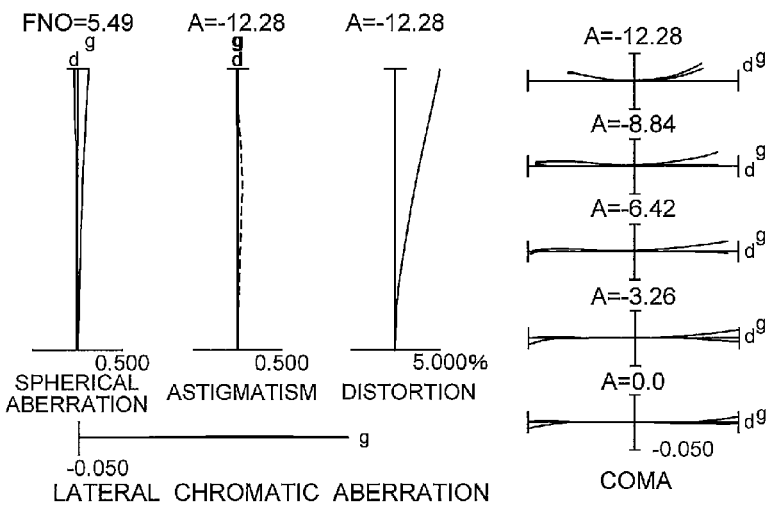

FIGS. 8A, 8B and 8C are graphs showing various aberrations of the variable magnification optical system according to the Third Example of the present application upon focusing on an infinite distance object, in a wide angle end state, in a first intermediate focal length state, and in a second intermediate focal length state, respectively.

Figure 9A:
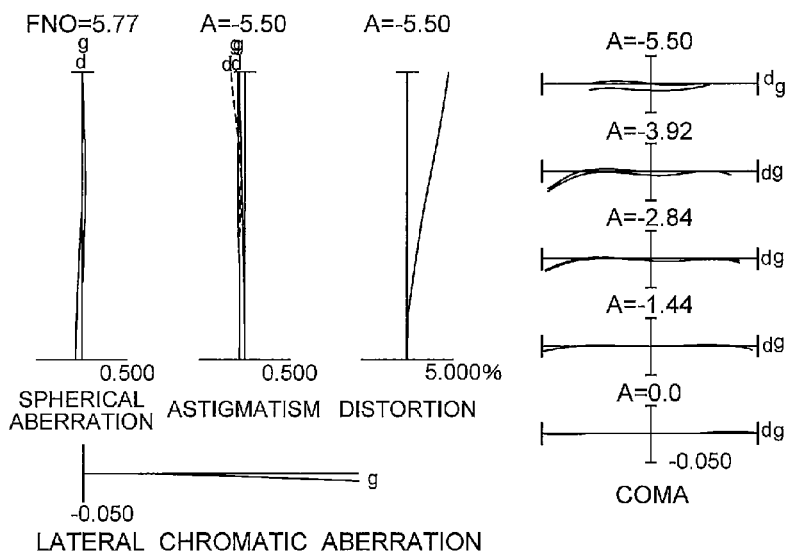
FIGS. 9A and 9B are graphs showing various aberrations of the variable magnification optical system according to the Third Example of the present application upon focusing on an infinite distance object, in the third intermediate focal length state, and in the telephoto end state, respectively.
Figure 9B:
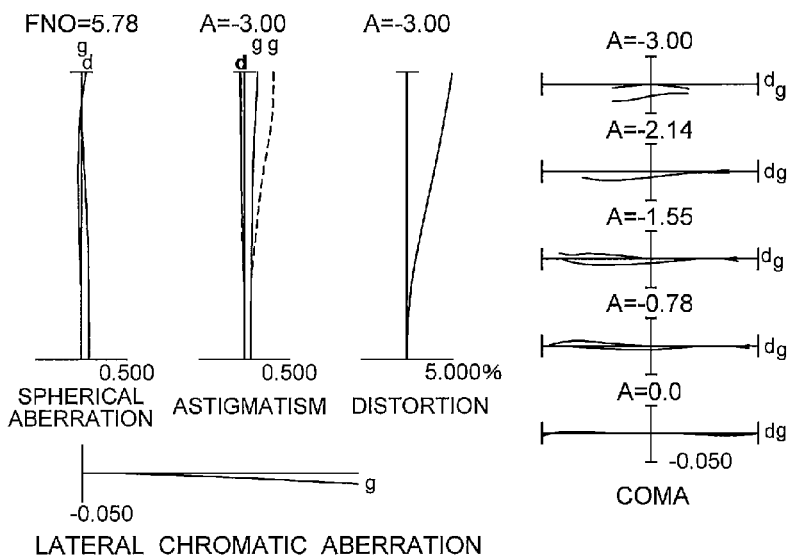

FIGS. 9A and 9B are graphs showing various aberrations of the variable magnification optical system according to the Third Example of the present application upon focusing on an infinite distance object, in a third intermediate focal length state, and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

According to the Examples, it is possible to realize a variable magnification optical system that has a high variable magnification ratio, is compact in size and exhibits high optical performance. Note that each of the above described Examples is a concrete example of the invention of the present application, and the invention of the present application is not limited to them. The contents described below can be adopted without deteriorating optical performance of the variable magnification optical systems according to the first and the second Embodiments of the present application.

Although the variable magnification optical systems each having a six-lens-group configuration were illustrated above as numerical examples of the variable magnification optical systems according to the first and the second Embodiments of the present application, the present application is not limited to them and the variable magnification optical systems having other configurations (such as seven-lens-group configuration and the like) can be constructed. Concretely, a lens configuration in which a lens or a lens group is added to the most object side of the variable magnification optical systems according to the first and the second Embodiments of the present application is possible, and another lens configuration in which a lens or a lens group is added to the most image side thereof is also possible. Incidentally, a lens group is defined as a portion including at least one lens separated by air spaces.

Further, in the variable magnification optical systems according to the first and the second Embodiments of the present application, in order to vary focusing from an infinitely distance object to a close object, a portion of a lens group, a single lens group in the entirety thereof, or a plurality of lens groups may be configured to move along the optical axis as a focusing lens group. It is particularly preferable that at least a portion of the second lens group, at least a portion of the third lens group, or at least a portion of the fourth lens group, or at least a portion of the fifth lens group is used as the focusing lens group. The focusing lens group can be used for auto focus, and is suitable for being driven by a motor for auto focus, such as an ultrasonic motor.

Further, in the variable magnification optical systems according to the first and the second Embodiments of the present application, any lens group in the entirety thereof or a portion thereof can be shifted in a direction including a component perpendicular to the optical axis as a vibration reduction lens group, or rotationally moved in an intra-plane direction including the optical axis, that is, swayed for correcting an image blur caused by a camera shake. Particularly, it is preferable that at least a portion of the second lens group, or at least a portion of the third lens group, or at least a portion of the fourth lens group, or at least a portion of the fifth lens group is used as a vibration reduction lens group.

Further, in the variable magnification optical systems according to the first and the second Embodiments of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if the image plane is shifted, deterioration in optical performance is little, so that it is preferable. When a lens surface is an aspherical surface, the aspherical surface may be fabricated by a grinding process, a glass molding process in which a glass material is formed into an aspherical shape by a mold, or a compound type process in which a resin material provided on a glass lens surface is formed into an aspherical shape. A lens surface may be a diffractive optical surface, and a lens may be a graded-index type lens (GRIN lens) or a plastic lens.

Further, in the variable magnification optical systems according to the first and the second Embodiments of the present application, it is preferable that the aperture stop is disposed in the third lens group or in the vicinity of the third lens group, and the function may be substituted by a lens frame without disposing a member as the aperture stop.

Moreover, the lens surface of the lenses configuring the variable magnification optical systems according to the first and the second Embodiments of the present application may be coated with an anti-reflection coating having a high transmittance in a broad wave range. With this contrivance, it is feasible to reduce a flare as well as ghost and attain high contrast and high optical performance.

Next, a camera equipped with the variable magnification optical system according to the first or the second Embodiment of the present application will be explained with referring to FIG. 10.

Figure 10:
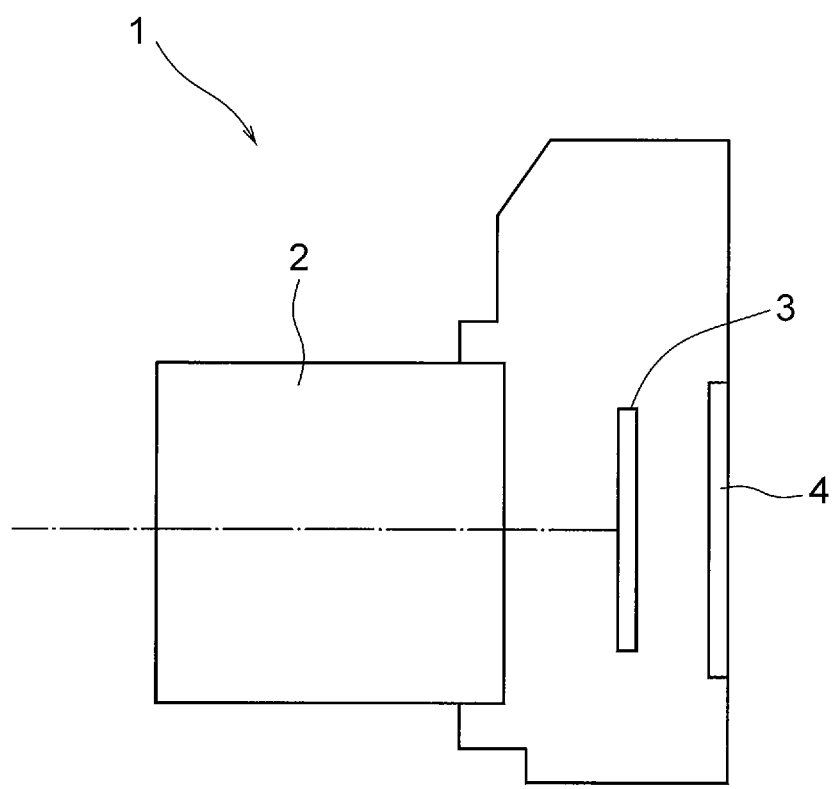
FIG. 10 is a view showing a configuration of a camera equipped with a variable magnification optical system according to the first embodiment or the second embodiment of the present application.

FIG. 10 is a view showing a configuration of a camera equipped with the variable magnification optical system according to the first or the second Embodiment of the present application.

The present camera 1 shown in FIG. 10 is a so-called mirrorless camera with interchangeable lenses equipped with the variable magnification optical system according to the first Example as an imaging lens 2.

In the present camera 1, light emitted from an unillustrated object as a subject is converged by the imaging lens 2, so that a subject image is formed on an imaging surface of an imaging part 3 through an unillustrated OLPF (optical low pass filter). The subject image then undergoes photoelectric conversion with a photoelectric conversion device in the imaging part 3 to generate an image of the subject. The image is displayed on an EVF 4 (electronic view finder) mounted on the camera 1. Accordingly, a photographer can observe the subject through the EVF 4.

Moreover, when the photographer presses an unillustrated release button down, the subject image generated in the imaging part 3 is stored in an unillustrated memory. In this manner, the photographer can take a picture of a subject by the camera 1.

Here, the variable magnification optical system according to the first Example installed as the imaging lens 2 in the camera 1 is a variable magnification optical system that has a high variable magnification ratio, is compact in size, and has high optical performance. Accordingly, the present camera 1 can realize downsizing and high optical performance while achieving a high variable magnification ratio. Incidentally, even if a variable magnification optical system according to the second or the third Example is installed as an imaging lens 2 in a camera, the same effect as the camera 1 can be obtained. Further, even if a variable magnification optical system according to each of the above described Examples is installed in a single-lens reflex camera, which includes a quick return mirror and is capable of observing a subject through a finder optical system, the same effect as the camera 1 can be achieved.

Figure 11:
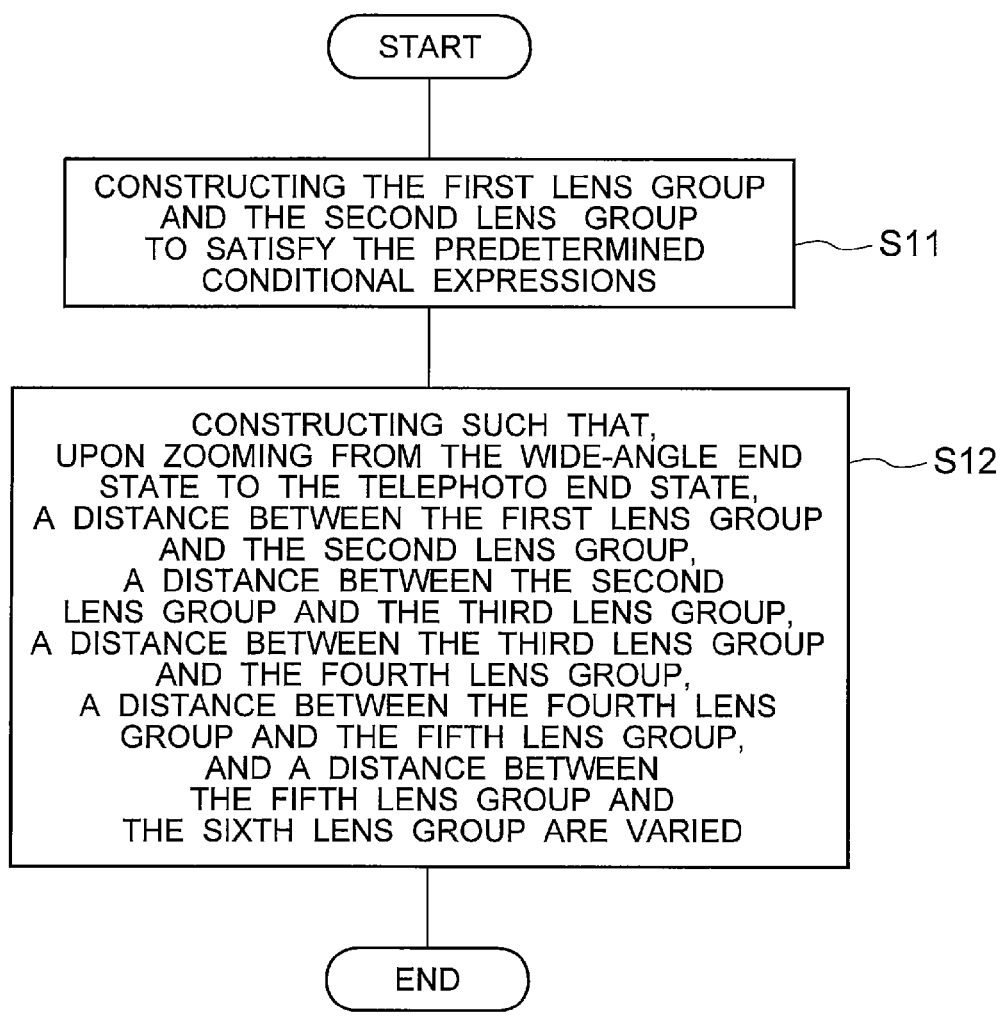
FIG. 11 is a flowchart schematically showing a method for manufacturing the variable magnification optical system according to the first embodiment of the present application.
Figure 12:
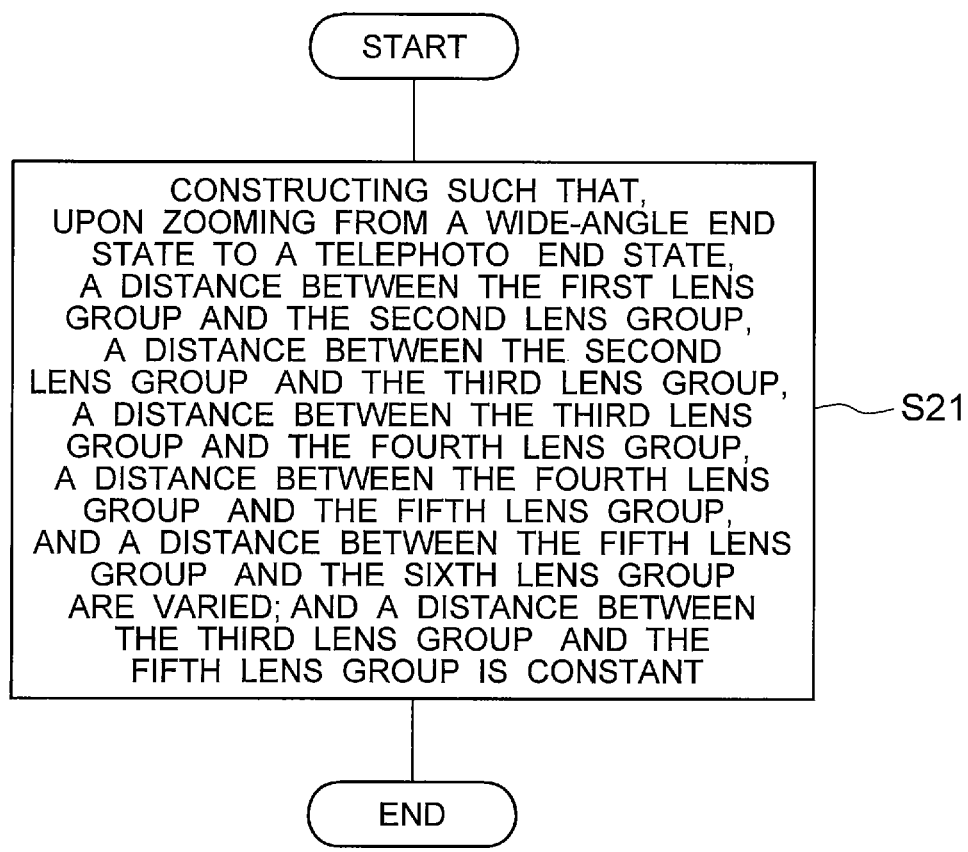
FIG. 12 is a flowchart schematically showing a method for manufacturing the variable magnification optical system according to the second embodiment of the present application.

Finally, an outline of methods for manufacturing variable magnification optical systems according to the first and the second Embodiments of the present application is described with referring to FIGS. 11 and 12.

The method for manufacturing the variable magnification optical system according to the first embodiment of the present application shown in FIG. 11 is a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group, and the method comprises the following steps of S11 and S12:

Step S11: Constructing the first lens group and the second lens group to satisfy the following conditional expressions (1) and (2), and disposing the first to the sixth lens groups in a lens barrel in order from an object side:

$$5.500 < f1/fw < 10.200 \tag{1}$$

$$0.057 < (-f2)/ft < 0.200 \tag{2}$$

where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group.

Step S12: Constructing, for example by providing a known movement mechanism in a lens barrel, such that, upon zooming from the wide angle end state to the telephoto end state, a distance between the first lens group and the second lens group, a distance between the second lens group and the third lens group, and a distance between the third lens group and the fourth lens group, a distance between the fourth lens group and the fifth lens group, and a distance between the fifth lens group and the sixth lens group are varied.

According to the method for manufacturing the variable magnification optical system according to the first embodiment of the present application, it is possible to manufacture a variable magnification optical system that has a high variable magnification ratio, is compact in size and exhibits high optical performance.

The method for manufacturing the variable magnification optical system according to the second embodiment of the present application shown in FIG. 12 is a method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group, and the method comprises the following step of S21:

Step S21: Disposing the first to the sixth lens groups in a lens barrel in order from an object side and constructing such that, by providing a known movement mechanism in the lens barrel, upon zooming from a wide angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied, and a distance between the third lens group and the fifth lens group is constant.

According to the method for manufacturing the variable magnification optical system according to the second embodiment of the present application, it is possible to manufacture a variable magnification optical system that has a high variable magnification ratio, is compact in size and exhibits high optical performance.

What is claimed is:

1. A variable magnification optical system comprising, in order from an object side: a first lens group having positive refractive power; a second lens group having negative refractive power; a third lens group having positive refractive power; a fourth lens group; a fifth lens group; and a sixth lens group;

upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group being varied; and the following conditional expressions being satisfied:

$$5.500 < f1/fw < 10.200$$

$$0.057 < (-f2)/ft < 0.200$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group, wherein upon zooming from the wide-angle end state to the telephoto end state, the first lens group is moved toward the object side.

2. The variable magnification optical system according to claim 1, wherein upon zooming from the wide-angle end state to the telephoto end state, the third lens group is moved toward the object side.

3. The variable magnification optical system according to claim 1, wherein the following conditional expression is satisfied:

$$0.420 < f3/f4 < 2.300$$

where f3 denotes a focal length of the third lens group, and f4 denotes a focal length of the fourth lens group.

4. The variable magnification optical system according to claim 1, wherein the following conditional expression is satisfied:

$$3.600 < f1/(-f2) < 7.510$$

where f1 denotes a focal length of the first lens group, and f2 denotes a focal length of the second lens group.

5. The variable magnification optical system according to claim 1, wherein upon zooming from the wide-angle end state to the telephoto end state, the sixth lens group is fixed in a position.

6. The variable magnification optical system according to claim 1, wherein the sixth lens group has positive refractive power.

7. The variable magnification optical system according to claim 1, wherein the fifth lens group has negative refractive power.

8. The variable magnification optical system according to claim 1, wherein the fourth lens group has positive refractive power.

9. The variable magnification optical system according to claim 1, wherein upon zooming from the wide-angle end state to the telephoto end state, a distance between the third lens group and the fifth lens group is constant.

10. The variable magnification optical system according to claim 1, wherein upon zooming from the wide-angle end state to the telephoto end state, the distance between the first lens group and the second lens group is increased.

11. The variable magnification optical system according to claim 1, wherein upon zooming from the wide-angle end state to the telephoto end state, the distance between the second lens group and the third lens group is decreased.

12. The variable magnification optical system according to claim 1, wherein at least a portion of the third lens group is moved to have a component in a direction perpendicular to an optical axis.

13. The variable magnification optical system according to claim 1, wherein at least a portion of the fourth lens group is moved in a direction of an optical axis upon focusing from an infinitely distant object to a close distant object.

14. The variable magnification optical system according to claim 1, wherein the following conditional expression is satisfied:

$$0.350 < f3/(-f5) < 2.000$$

where f3 denotes a focal length of the third lens group, and f5 denotes a focal length of the fifth lens group.

15. An optical apparatus equipped with the variable magnification optical system according to claim 1.

16. The variable magnification optical system according to claim 1, wherein the following conditional expression is satisfied:

$$5.500 < f1/fw \leq 7.510.$$

17. A method for manufacturing a variable magnification optical system comprising, in order from an object side: a first lens group having positive refractive power; a second lens group having negative refractive power; a third lens group having positive refractive power; a fourth lens group; a fifth lens group; and
a sixth lens group;
the method comprising the steps of:
constructing the first lens group and the second lens group to satisfy the following conditional expressions $5.500 < f1/fw < 10.200$ $0.057 < (-f2)/ft < 0.200$ where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group; and
constructing such that, upon zooming from the wide-angle end state to the telephoto end state, the first lens group is moved toward the object side, and that a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied.

18. A variable magnification optical system comprising, in order from an object side: a first lens group having positive refractive power; a second lens group having negative refractive power; a third lens group having positive refractive power; a fourth lens group; a fifth lens group; and a sixth lens group;
upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group being varied; and
the following conditional expressions being satisfied:

$5.500 < f1/fw < 10.200$ $0.057 < (-f2)/ft < 0.200$ $0.710 < f3/f4 < 0.985$ where fw denotes a focal length of the variable magnification optical system in the wide-angle end state, ft denotes a focal length of the variable magnification optical system in the telephoto end state, f1 denotes a focal length of the first lens group, f2 denotes a focal length of the second lens group, f3 denotes a focal length of the third lens group, and f4 denotes a focal length of the fourth lens group.

19. A variable magnification optical system comprising, in order from an object side: a first lens group having positive refractive power; a second lens group having negative refractive power; a third lens group having positive refractive power; a fourth lens group; a fifth lens group; and a sixth lens group;
upon zooming from a wide-angle end state to a telephoto end state, a distance between the first lens group and the second lens group, a distance between the second lens group and the third lens group, a distance between the third lens group and the fourth lens group, a distance between the fourth lens group and the fifth lens group, a distance between the fifth lens group and the sixth lens group being varied; and
the following conditional expressions being satisfied:

$5.500 < f1/fw < 10.200$ $0.057 < (-f2)/ft < 0.200$ $0.420 < f3/f4 < 0.985$ $6.087 \leq f1/(-f2) < 7.510$ where fw denotes a focal length of the variable magnification optical system in the wide-angle end state, ft denotes a focal length of the variable magnification optical system in the telephoto end state, f1 denotes a focal length of the first lens group, f2 denotes a focal length of the second lens group, f3 denotes a focal length of the third lens group, and f4 denotes a focal length of the fourth lens group.

20. A method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group;
the method comprising the steps of:
constructing the first lens group and the second lens group to satisfy the following conditional expressions:

$5.500 < f1/fw < 10.200$ $0.057 < (-f2)/ft < 0.200$ $0.710 < f3/f4 < 0.985$ where fw denotes a focal length of the variable magnification optical system in the wide-angle end state, ft denotes a focal length of the variable magnification optical system in the telephoto end state, f1 denotes a focal length of the first lens group, f2 denotes a focal length of the second lens group, f3 denotes a focal length of the third lens group, and f4 denotes a focal length of the fourth lens group; and
constructing such that, upon zooming from the wide-angle end state to the telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied.

21. A method for manufacturing a variable magnification optical system comprising, in order from an object side: a first lens group having positive refractive power; a second lens group having negative refractive power; a third lens group having positive refractive power; a fourth lens group; a fifth lens group; and a sixth lens group;
the method comprising the steps of:
constructing the first lens group and the second lens group to satisfy the following conditional expressions:

$5.500 < f1/fw < 10.200$ $0.057 < (-f2)/ft < 0.200$ $0.420 < f3/f4 < 0.985$ $6.087 \leq f1/(-f2) < 7.510$ where fw denotes a focal length of the variable magnification optical system in a wide-angle end state, ft denotes a focal length of the variable magnification optical system in a telephoto end state, f1 denotes a focal length of the first lens group, f2 denotes a focal length of the second lens group, f3 denotes a focal length of the third lens group, and f4 denotes a focal length of the fourth lens group; and constructing such that, upon zooming from the wide-angle end state to the telephoto end state, a distance between the first lens group and the second lens group, a distance between the second lens group and the third lens group, a distance between the third lens group and the fourth lens group, a distance between the fourth lens group and the fifth lens group, and a distance between the fifth lens group and the sixth lens group are varied.

* * * * *